United States Patent
Guo et al.

(10) Patent No.: US 10,201,003 B2
(45) Date of Patent: Feb. 5, 2019

(54) METHOD AND DEVICE FOR TRANSMITTING DOWNLINK DATA IN MULTIPLE UES COOPERATIVE COMMUNICATION

(71) Applicant: Huawei Technologies Co., Ltd., Shenzhen (CN)

(72) Inventors: Xiaolong Guo, Shenzhen (CN); Yue Li, Shenzhen (CN); Fei Yang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 405 days.

(21) Appl. No.: 14/624,191

(22) Filed: Feb. 17, 2015

(65) Prior Publication Data

US 2015/0163822 A1 Jun. 11, 2015

Related U.S. Application Data

(63) Continuation of application No. PCT/CN2012/080295, filed on Aug. 17, 2012.

(51) Int. Cl.
*H04W 4/00* (2018.01)
*H04W 72/12* (2009.01)
*H04W 88/04* (2009.01)

(52) U.S. Cl.
CPC ..... *H04W 72/1205* (2013.01); *H04W 72/121* (2013.01); *H04W 88/04* (2013.01)

(58) Field of Classification Search
CPC ............ H04W 72/1205; H04W 72/121; H04W 88/04; H04W 72/12
See application file for complete search history.

(56) References Cited

U.S. PATENT DOCUMENTS

| | | | |
|---|---|---|---|
| 2007/0070954 A1 | 3/2007 | Kim et al. | |
| 2010/0080139 A1* | 4/2010 | Palanki | H04B 7/2606 370/252 |
| 2011/0044272 A1 | 2/2011 | Cui et al. | |

(Continued)

FOREIGN PATENT DOCUMENTS

| | | |
|---|---|---|
| CN | 101370301 A | 2/2009 |
| CN | 101471754 A | 7/2009 |

(Continued)

*Primary Examiner* — Yemane Mesfin
*Assistant Examiner* — Abdelillah Elmejjarmi
(74) *Attorney, Agent, or Firm* — Brinks Gilson & Lione

(57) ABSTRACT

Embodiments of the present invention provide a method and a device for transmitting downlink data in multiple UEs cooperative communication. A base station selects a benefitted user equipment UE, where the benefitted UE and a supporting UE are UEs in a closed cooperative group, each data radio bearer of each UE in the cooperative group corresponds to a logical channel identifier LCID, and the LCID is unique in the cooperative group; the base station generates a media access control packet data unit MAC PDU, where the MAC PDU comprises data to be sent by a data radio bearer of the benefitted UE, and a LCID corresponding to the data radio bearer, and the base station sends the MAC PDU to the supporting UE. The above solutions achieve a method of multiple UEs cooperative communication for synthesizing on the MAC layer.

30 Claims, 9 Drawing Sheets

(56) References Cited

U.S. PATENT DOCUMENTS

| | | | |
|---|---|---|---|
| 2012/0020278 A1* | 1/2012 | Moberg | H04B 7/155 |
| | | | 370/315 |
| 2012/0093070 A1* | 4/2012 | Huang | H04B 7/2606 |
| | | | 370/315 |
| 2012/0100808 A1 | 4/2012 | Suzuki | |
| 2012/0188935 A1* | 7/2012 | Frederiksen | H04B 7/2606 |
| | | | 370/315 |
| 2012/0300689 A1* | 11/2012 | Lee | H04W 24/10 |
| | | | 370/312 |

FOREIGN PATENT DOCUMENTS

| | | | | |
|---|---|---|---|---|
| CN | 101472241 A | | 7/2009 | |
| CN | 101867871 A | | 10/2010 | |
| CN | 101990304 | * | 3/2011 | H04W 28/065 |
| CN | 101997583 A | | 3/2011 | |
| CN | 102045859 A | | 5/2011 | |
| WO | WO 2010/150050 A1 | | 12/2010 | |

* cited by examiner

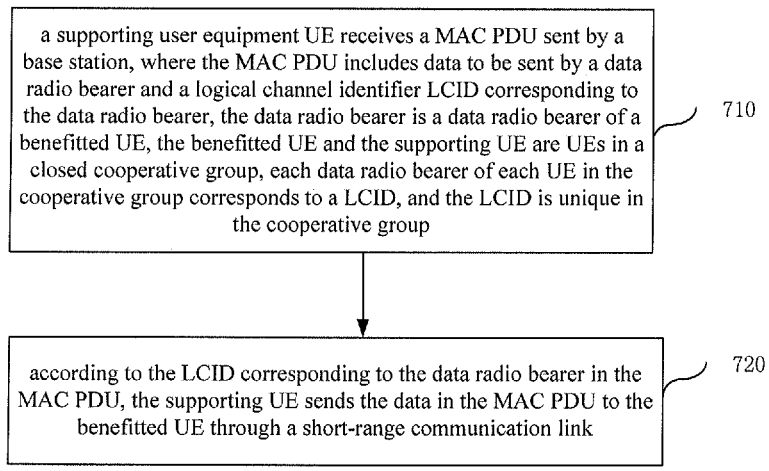

a supporting user equipment UE receives a MAC PDU sent by a base station, where the MAC PDU includes data to be sent by a data radio bearer and a logical channel identifier LCID corresponding to the data radio bearer, the data radio bearer is a data radio bearer of a benefitted UE, the benefitted UE and the supporting UE are UEs in a closed cooperative group, each data radio bearer of each UE in the cooperative group corresponds to a LCID, and the LCID is unique in the cooperative group  —  710 according to the LCID corresponding to the data radio bearer in the MAC PDU, the supporting UE sends the data in the MAC PDU to the benefitted UE through a short-range communication link  —  720

FIG. 7 the supporting UE demultiplexes the data to be sent by the data radio bearer in the MAC PDU, and generates a new data packet, where the new data packet includes the data to be sent by the data radio bearer in the MAC PDU and an identifier corresponding to the data radio bearer  —  7201 the supporting UE sends the new data packet to the benefitted UE through the short-range communication link, the new data packet includes the data and the LCID corresponding to the data radio bearer  —  7202

FIG. 8

METHOD AND DEVICE FOR TRANSMITTING DOWNLINK DATA IN MULTIPLE UES COOPERATIVE COMMUNICATION

CROSS-REFERENCE TO RELATED APPLICATIONS

This application is a continuation of International Application No. PCT/CN2012/080295, filed on Aug. 17, 2012, which is hereby incorporated by reference in its entirety.

TECHNICAL FIELD

The present invention relates to the field of wireless communications, and more particularly, to a method and a device for transmitting downlink data in multiple UEs cooperative communication.

BACKGROUND

The existing user equipments (UE) basically can support short-range communication technology and cellular communication technology simultaneously. The cellular communication technology can be, such as a long term evolution (LTE), a universal mobile telecommunications system (UMTS), code division multiple access (CDMA), a global system for mobile communications (GSM), a general packet radio service (GPRS) and worldwide interoperability for microwave access (WiMAX). The short-range wireless communication generally refers to a technology of providing wireless communications within a smaller area (such as, hundreds of meters), and the existing common short-range wireless communication technologies include: institute of electrical and electronics engineers (IEEE) 802.11 wireless local area network (WLAN), IEEE802.15 wireless personal area network (WPAN), home radio frequency (HomeRF), infrared transmission technology, and LTE-device to device (LTE-D2D), etc.

LTE aims to provide a low-cost network capable of reducing the time delay, raising the user data rate, and improving the system capacity and coverage. The LTE adopts packet switch (PS) domain services, and the bearer networks are all Internet protocol (IP) bearers.

Hereinafter, the illustration is made by taking LTE in cellular communication technologies and wireless fidelity (WiFi) in short-range communication technologies as an example, and various combinations of other short-range communication technologies and cellular communication technologies are similar to this, and no further details are given here. The WiFi is a type of short-range communication technology based on IEEE 802.11.

A determined user-plane bearer in a LTE network is as shown in FIG. 1, and the air interface protocol stack between a UE and an evolved node B (eNB) from top to bottom includes: a packet data convergence protocol (PDCP), a radio link control (RLC), a media access control (MAC) and a physical layer (PHY). A GPRS tunneling protocol for user plane (GTP-U) is a tunnelling protocol within the network. The functions of the MAC layer between the physical layer and the RLC layer mainly include: hybrid automatic repeat-request (HARQ), logical channel to transport channel mapping, multiplexing, demultiplexing and random access control, etc. The MAC layer of the base station also has a function of scheduling UE.

The base station can schedule all the UEs in an active state under the base station, that is, the base station selects one or more UEs to send or receive data in certain time domain and frequency domain resources. The base station selects the UE by ranking all the UEs in the active state under the base station according to the scheduling ranking algorithm, and then selects the highest ranked UE to perform priority scheduling. For example, if the base station performs scheduling with a granularity of one or more resource blocks, then the base station ranks all the UEs in the active state under the base station according to the scheduling ranking algorithm in each granularity, and then selects the highest ranked UE to perform priority scheduling.

The commonly-used scheduling ranking algorithm can be a proportional fair (PF) algorithm, and the basic idea is to rank the result of dividing a channel quality indicator (CQI) of each UE by an average rate (AR), namely CQI/AR, in each granularity, and then selects the highest ranked UE to perform priority scheduling. Where the "/" represents division. If taking five resource blocks as a granularity, rank every five resource blocks, select a UE with the highest CQI/AR, and schedule the UE with the highest CQI/AR on the resource of the five resource blocks. It should be noted that, the average rate is obtained through a certain algorithm, such as accumulating several most recently used rates for transmitting data by a certain proportion, and any algorithm for calculating the average rate can be used to perform scheduling ranking on the UE.

In particular, the eNB scheduling UE includes: the eNB notifies, on a physical downlink control channel (PDCCH) and through a scheduling command scrambled by a cell radio network temporary identifier (C-RNTI) of the UE, the UE of using which modulation and coding scheme (MCS) on which (corresponding resource block of) time domain and frequency domain resource to receive data on a physical downlink shared channel (PDSCH). If the eNB schedules a UE, then the UE can detect the scheduling command scrambled by the C-RNTI of itself on the PDCCH, and obtain scheduling control information by decoding PDCCH, and find the data sent to it on the PDSCH according to the time domain and frequency domain resource and the MCS included in the scheduling control information. The data is sent by a MAC packet data unit (MAC PDU). For the UE selected for scheduling, the eNB selects and sends data according to the quality of service (QoS) of its different radio bears (RB), in particular, the eNB can select the data of different radio bears within the UE through scheduling manners such as a token bucket etc. Different radio bearers correspond to different radio bearer-identifiers (RB-ID), and the RB-ID is mapped to a unique logical channel identifier (LCID) on the MAC layer. The MAC layer can learn the radio bearer corresponding to the MAC SDU through the LCID corresponding to each MAC service data unit (MAC SDU) and MAC control element (MAC CE) in the MAC PDU, or learn that the MAC CE with what function corresponds to the LCID. In particular, the radio bearer includes data radio bearer (DRB) and signalling radio bearer (SRB). The LCID corresponding to the SRB is also a fixed value. Generally, the LCID corresponding to the DRB is a value from 3 to 10.

In a traditional method, a first UE selected by scheduling ranking and a second UE actually scheduled by the base station are the same UEs. In particular, the first UE selected by scheduling ranking is the user of data (receiver of downlink data), and the first UE is also referred to as a pre-scheduled UE herein. The second UE actually scheduled by the base station is the UE which is notified by the base station through a scheduling command scrambled by the C-RNTI of the second UE on the PDCCH, of using which MCS on which time domain and frequency domain resource to receive data on the PDSCH, and the second UE is also referred to as an actually-scheduled UE herein.

The basic principle of the current method of multiple UEs cooperative communication (MUCC) is to establish cooperative communication relationship among UEs according to the feature that two or more UEs all support WiFi and LTE at the same time. For example, one UE needs to send or receive data, and one or more other UEs can support the UE and assist the communication, so that reliability and throughput rate can be increased. However, no effective method for performing cooperative communication on the MAC layer is proposed in the current multiple UEs cooperative communication, to make operation of the multiple UEs cooperative communication safe and reliable.

SUMMARY

Accordingly, embodiments of the present invention provide a method and a device for accomplishing multiple UEs cooperative communication, so as to solve the problem of how to performing multiple UEs cooperative communication on the MAC layer.

A first aspect provides a method for transmitting downlink data in multiple UEs cooperative communication, including:

selecting, by a base station, a benefitted user equipment UE, where the benefitted UE and a supporting UE are UEs in a closed cooperative group, each data radio bearer of each UE in the cooperative group corresponds to a logical channel identifier LCID, and the LCID is unique in the cooperative group;

generating, by the base station, a media access control packet data unit MAC PDU, where the MAC PDU includes data to be sent by a data radio bearer of the benefitted UE and a LCID corresponding to the data radio bearer; and sending, by the base station, the MAC PDU to the supporting UE.

In a first possible implementation of the first aspect, before selecting, by the base station, the benefitted UE, the method further includes: taking, by the base station, all the UEs in the cooperative group as a whole, and performing scheduling ranking on the cooperative group with other UEs under the base station other than all the UEs in the cooperative group, and selecting the cooperative group;

the selecting, by the base station, the benefitted UE includes: selecting, by the base station, one or more benefitted UEs in the cooperative group;

the generating, by the base station, the MAC PDU includes: selecting, by the base station, the data from each data radio bearer of the one or more benefitted UEs, and generating the MAC PDU by using the data.

In a second possible implementation by combining the first possible implementation of the first aspect, in the performing scheduling ranking on the cooperative group with other UEs under the base station other than all the UEs in the cooperative group, a scheduling ranking value of the cooperative group is (a maximum channel quality indicator CQI in the cooperative group÷an average rate AR of the cooperative group)×the number of all the UEs in the cooperative group.

In a third possible implementation of the first aspect, the selecting, by the base station, the benefitted UE includes: performing, by the base station, scheduling ranking on all the UEs under the base station, and selecting one benefitted UE;

the generating, by the base station, the MAC PDU includes: selecting, by the base station, the data from the data radio bearer of the one benefitted UE, and generating the MAC PDU by using the data.

In a fourth possible implementation by combining the first aspect or any possible implementation of the first aspect, the MAC PDU further includes data to be sent by a signalling radio bearer of the benefitted UE and/or the supporting UE, and each signalling radio bearer of each UE in the cooperative group corresponds to a unique LCID.

In a fifth possible implementation by combining the first aspect or any of the first to the third possible implementations of the first aspect, the MAC PDU further includes data to be sent by a signalling radio bearer of the supporting UE, and a same signalling radio bearer of all the UEs in the cooperative group corresponds to a same LCID.

In a sixth possible implementation by combining the first aspect or any possible implementation of the first aspect, the MAC PDU further includes a MAC control element CE of the supporting UE and/or data to be sent by a data radio bearer of the supporting UE.

A second aspect provides a method for transmitting downlink data in multiple UEs cooperative communication, including:

receiving, by a supporting user equipment UE, a media access control packet data unit MAC PDU sent by a base station, where the MAC PDU includes data to be sent by a data radio bearer and a logical channel identifier LCID corresponding to the data radio bearer, the data radio bearer is a data radio bearer of a benefitted UE, the benefitted UE and the supporting UE are UEs in a closed cooperative group, each data radio bearer of each UE in the cooperative group corresponds to a LCID, and the LCID is unique in the cooperative group; and sending, by the supporting UE, according to a LCID corresponding to the data radio bearer in the MAC PDU, the data in the MAC PDU to the benefitted UE through a short-range communication link.

In a first possible implementation of the second aspect, the sending, by the supporting UE, the data in the MAC PDU to the benefitted UE through the short-range communication link, includes:

directly sending, by the supporting UE, the MAC PDU to the benefitted UE through the short-range communication link; or demultiplexing, by the supporting UE, the data to be sent by the data radio bearer in the MAC PDU, generating a new data packet, and sending the new data packet to the benefitted UE through the short-range communication link, where the new data packet includes the data to be sent by the data radio bearer in the MAC PDU and an identifier corresponding to the data radio bearer.

In a second possible implementation by combining the first possible implementation of the second aspect, the identifier corresponding to the data radio bearer included in the new data packet is the LCID corresponding to the data radio bearer.

In a third possible implementation by combining the first or the second possible implementation of the second aspect, the generating the new data packet includes:

generating a plurality of new data packets corresponding to the plurality of the benefitted UEs by using data to be sent by a plurality of data radio bearers of a plurality of benefitted UEs included in the MAC PDU; or generating one new data packet by using data to be sent by a plurality of data radio bearers of a plurality of benefitted UEs included in the MAC PDU.

In a fourth possible implementation by combining the second aspect or any possible implementation of the second aspect, the sending, by the supporting UE, the data in the MAC PDU to the benefitted UE through the short-range communication link, includes:

detecting, by the supporting UE, the LCID in the MAC PDU, and determining, according to the LCID in the MAC PDU, the benefited UE to which the data radio bearer corresponding to the LCID belongs;

sending, by the supporting UE, the data to be sent by the data radio bearer corresponding to the LCID in the MAC PDU to the benefitted UE through the short-range communication link.

In a fifth possible implementation by combining the fourth possible implementation of the second aspect, the determining, according to the LCID in the MAC PDU, the benefitted UE to which the data radio bearer corresponding to the LCID belongs, includes:

determining, by the supporting UE, the benefitted UE corresponding to the LCID in the MAC PDU according to a pre-stored correspondence between each UE in the cooperative group and the LCID of the each UE.

In a sixth possible implementation by combining the second aspect or any possible implementation of the second aspect, the sending, by the supporting UE, the data in the MAC PDU to the benefitted UE through the short-range communication link, includes:

detecting, by the supporting UE, the LCID in the MAC PDU, and determining, according to the LCID in the MAC PDU, that the data radio bearer corresponding to the LCID in the MAC PDU does not belong to the supporting UE;

broadcasting, by the supporting UE, the data in the MAC PDU or the MAC PDU in the cooperative group through the short-range communication link, so that the benefitted UE receives the data in the MAC PDU.

In a seventh possible implementation by combining the second aspect or any possible implementation of the second aspect, each signalling radio bearer of the each UE in the cooperative group corresponds to a LCID, and the LCID corresponding to the each signalling radio bearer is unique in the cooperative group;

the MAC PDU further includes data to be sent by a signalling radio bearer of the benefitted UE; the sending, by the supporting UE, the data in the MAC PDU to the benefitted UE through the short-range communication link, includes: sending, by the supporting UE, the data to be sent by the signalling radio bearer of the benefitted UE and the data to be sent by the data radio bearer of the benefitted UE in the MAC PDU to the benefitted UE through the short-range communication link; and/or the MAC PDU further includes data to be sent by a signalling radio bearer of the supporting UE; after receiving, by the supporting UE, the MAC PDU sent by the base station, the method further includes: reserving, by the supporting UE, the data to be sent by the signalling radio bearer of the supporting UE in the MAC PDU.

In an eighth possible implementation by combining the second aspect or any of the first to the sixth possible implementations of the second aspect, the MAC PDU further includes data to be sent by a signalling radio bearer, and the signalling radio bearer is a signalling radio bearer of the supporting UE, and a same signalling radio bearer of all the UEs in the cooperative group corresponds to a same LCID;

after receiving, by the supporting UE, the MAC PDU sent by the base station, the method further includes:

reserving, by the supporting UE, the data to be sent by the signalling radio bearer of the supporting UE in the MAC PDU.

In a ninth possible implementation by combining the second aspect or any possible implementation of the second aspect, the MAC PDU further includes a MAC control element CE, and the MAC CE is a MAC CE of the supporting UE;

after receiving, by the supporting UE, the MAC PDU sent by the base station, the method further includes:

reserving, by the supporting UE, the MAC CE of the supporting UE in the MAC PDU.

In a tenth possible implementation by combining the second aspect or any possible implementation of the second aspect, after receiving, by the supporting UE, the MAC PDU sent by the base station, the method further includes:

if the supporting UE detects that the MAC PDU further includes data corresponding to a data radio bearer of the supporting UE, determining, by the supporting UE, a corresponding data radio bearer of the supporting UE according to a LCID corresponding to the data radio bearer of the supporting UE.

In an eleventh possible implementation by combining the second aspect or any possible implementation of the second aspect, the sending, by the supporting UE, the data in the MAC PDU to the benefitted UE, includes:

forwarding, by the supporting UE, the data in the MAC PDU to the benefitted UE through a UE in the cooperative group other than the supporting UE and the benefitted UE.

A third aspect provides a method for transmitting downlink data in multiple UEs cooperative communication, including:

receiving, by a benefitted UE, a data packet sent by a supporting UE through a short-range communication link, where the data packet consists of data in a media access control packet data unit MAC PDU sent by a base station to the supporting UE, the data packet includes data to be sent by a data radio bearer of the benefitted UE and an identifier corresponding to the data radio bearer, the benefitted UE and the supporting UE are UEs in a closed cooperative group, each data radio bearer of each UE in the cooperative group corresponds to a logical channel identifier LCID, and the LCID is unique in the cooperative group; and acquiring, according to the identifier corresponding to the data radio bearer, the data to be sent by the data radio bearer in the data packet.

In a first possible implementation of the third aspect, the data packet is the MAC PDU received by the supporting UE from the base station; or the data packet is a data packet formed by using the data to be sent by the data radio bearer of the benefitted UE and the identifier corresponding to the data radio bearer after the supporting UE demultiplexes the MAC PDU.

In a second possible implementation by combining the third aspect or the first possible implementation of the third aspect, the identifier corresponding to the data radio bearer is a LCID corresponding to the data radio bearer.

In a third possible implementation by combining the third aspect or any possible implementation of the third aspect, the data packet further includes data to be sent by a signalling radio bearer of the benefitted UE, where each signalling radio bearer of the each UE in the cooperative group corresponds to a LCID, and the LCID corresponding to the each signalling radio bearer is unique in the cooperative group.

A fourth aspect provides a base station, including:

a selecting module, configured to select a benefitted user equipment UE, where the benefitted UE and a supporting UE are UEs in a closed cooperative group, each data radio bearer of each UE in the cooperative group corresponds to a logical channel identifier LCID, and the LCID is unique in the cooperative group;

a generating module, configured to generate a media access control packet data unit MAC PDU, where the MAC PDU includes data to be sent by a data radio bearer of the benefitted UE selected by the selecting module and a LCID corresponding to the data radio bearer; and a sending module, configured to send the MAC PDU generated by the generating module to the supporting UE.

In a first possible implementation of the fourth aspect, the selecting module is further configured to take all the UEs in the cooperative group as a whole, and perform scheduling ranking on the cooperative group with other UEs under the base station other than all the UEs in the cooperative group, and select the cooperative group;

the selecting module is specifically configured to select the benefitted UE as follows: select one or more benefitted UEs in the cooperative group;

the generating module is specifically configured to generate the MAC PDU as follows: select the data from each data radio bearer of the one or more benefitted UEs, and generate the MAC PDU by using the data.

In a second possible implementation by combining the first possible implementation of the fourth aspect, the selecting module is specifically configured to take all the UEs in the cooperative group as a whole and perform scheduling ranking on the cooperative group with other UEs under the base station other than all the UEs in the cooperative group as follows: take a value of (a maximum channel quality indicator CQI in the cooperative group÷an average rate AR of the cooperative group)×the number of all the UEs in the cooperative group as a scheduling ranking value of the cooperative group, and perform scheduling ranking on the cooperative group with other UEs under the base station other than all the UEs in the cooperative group.

In a third possible implementation of the fourth aspect, the selecting module is specifically configured to select the benefitted UE as follows: perform scheduling ranking on all the UEs under the base station, and select, by the base station, one benefitted UE;

the generating module is specifically configured to generate the MAC PDU as follows: select, by the base station, the data from the data radio bearer of the one benefitted UE, and generate the MAC PDU by using the data.

In a fourth possible implementation by combining the fourth aspect or any possible implementation of the fourth aspect, the generating module is further configured to incorporate data to be sent by a signalling radio bearer of the benefitted UE and/or the supporting UE in the MAC PDU, where each signalling radio bearer of the each UE in the cooperative group corresponds to a unique LCID.

In a fifth possible implementation by combining the fourth aspect or any of the first to the third possible implementations of the fourth aspect, the generating module is further configured to incorporate data to be sent by a signalling radio bearer of the supporting UE in the MAC PDU, where a same signalling radio bearer of all the UEs in the cooperative group corresponds to a same LCID.

In a sixth possible implementation by combining the fourth aspect or any possible implementation of the fourth aspect, the generating module is further configured to incorporate a MAC control element CE of the supporting UE and/or data to be sent by a data radio bearer of the supporting UE in the MAC PDU.

A fifth aspect provides a user equipment UE being a supporting UE, including:

a receiving module, configured to receive a media access control packet data unit MAC PDU sent by a base station, where the MAC PDU includes data to be sent by a data radio bearer and a logical channel identifier LCID corresponding to the data radio bearer, the data radio bearer is a data radio bearer of a benefitted user equipment UE, the benefitted UE and the supporting UE are UEs in a closed cooperative group, each data radio bearer of each UE in the cooperative group corresponds to a unique LCID; and a selecting and sending module, configured to send the data in the MAC PDU received by the receiving module to the benefitted UE through a short-range communication link.

In a first possible implementation of the fifth aspect, the selecting and sending module is specifically configured to send the data in the MAC PDU to the benefitted UE through the short-range communication link as follows: directly send the MAC PDU to one or more benefitted UEs through the short-range communication link; or the selecting and sending module includes:

a demultiplexing unit, configured to demultiplex the data to be sent by the data radio bearer in the MAC PDU;

a generating unit, configured to generate a new data packet by using the data to be sent by the data radio bearer, demultiplexed by the demultiplexing unit, where the new data packet includes the data to be sent by the data radio bearer in the MAC PDU and an identifier corresponding to the data radio bearer;

a sending unit, configured to send the new data packet generated by the generating unit to the benefitted UE through the short-range communication link.

In a second possible implementation by combining the first possible implementation of the fifth aspect, the generating unit is specifically configured to generate the new data packet as follows: take a LCID corresponding to the data radio bearer in the MAC PDU as the identifier corresponding to the data radio bearer, and generate the new data packet.

In a third possible implementation by combining the first or the second possible implementation of the fifth aspect, the generating unit is specifically configured to generate the new data packet as follows: generating a plurality of new data packets corresponding to the plurality of the benefitted UEs by using data to be sent by a plurality of data radio bearers of a plurality of benefitted UEs included in the MAC PDU; or the generating unit is specifically configured to generate the new data packet as follows: generate one new data packet by using data to be sent by a plurality of data radio bearers of a plurality of benefitted UEs included in the MAC PDU.

In a fourth possible implementation by combining the fifth aspect or any possible implementation of the fifth aspect, the selecting and sending module is specifically configured to send the data in the MAC PDU to the benefitted UE through the short-range communication link as follows:

detect the LCID in the MAC PDU, and determine, according to the LCID in the MAC PDU, the benefitted UE to which the data radio bearer corresponding to the LCID in the MAC PDU belongs;

send the data to be sent by the data radio bearer corresponding to the LCID in the MAC PDU to the benefitted UE through the short-range communication link.

In a fifth possible implementation by combining the fourth possible implementation of the fifth aspect, the user equipment further includes:

a storing module, configured to store a correspondence between each UE in the cooperative group and the LCID of the each UE;

the selecting and sending module is specifically configured to determine, according to the LCID in the MAC PDU, the benefitted UE to which the data radio bearer corresponding to the LCID belongs as follows: determine, according to the correspondence in the cooperative group stored in the storing module, the benefitted UE corresponding to the LCID in the MAC PDU.

In a sixth possible implementation by combining the fifth aspect or any possible implementation of the fifth aspect, the selecting and sending module is specifically configured to determine, according to the LCID in the MAC PDU, the benefitted UE to which the data radio bearer corresponding to the LCID in the MAC PDU belongs as follows: detect the LCID in the MAC PDU, and determine, according to the LCID in the MAC PDU, that the data radio bearer corresponding to the LCID in the MAC PDU does not belong to the supporting UE, broadcast the data in the MAC PDU or the MAC PDU in the cooperative group through the short-range communication link, so that the benefitted UE receives the data in the MAC PDU.

In a seventh possible implementation by combining the fifth aspect or any possible implementation of the fifth aspect, the selecting and sending module is further configured to demultiplex the MAC PDU, acquire data to be sent by a signalling radio bearer of the supporting UE included in the MAC PDU; reserve the data corresponding to the signalling radio bearer of the supporting UE in the MAC PDU; and/or the selecting and sending module is further configured to demultiplex the MAC PDU, acquire data to be sent by a signalling radio bearer of the benefitted UE included in the MAC PDU; the selecting and sending module is specifically configured to send the data in the MAC PDU to the benefitted UE through the short-range communication link as follows: send the data corresponding to the signalling radio bearer of the benefitted UE in the MAC PDU to the one or more benefitted UEs through the short-range communication link.

In an eighth possible implementation by combining the fifth aspect or any of the first to the sixth possible implementations of the fifth aspect, the selecting and sending module is further configured to demultiplex the MAC PDU, acquire data to be sent by a signalling radio bearer of the supporting UE included in the MAC PDU, reserve the data to be sent by the signalling radio bearer in the MAC PDU, where a same signalling radio bearer of each the UE in the cooperative group corresponds to a same LCID.

In a ninth possible implementation by combining the fifth aspect or any possible implementation of the fifth aspect, the selecting and sending module is further configured to demultiplex the MAC PDU, acquire a MAC control element CE included in the MAC PDU, reserve the MAC CE in the MAC PDU, where the MAC CE is a MAC CE of the supporting UE.

In a tenth possible implementation by combining the fifth aspect or any possible implementation of the fifth aspect, the selecting and sending module is further configured to demultiplex the MAC PDU, acquire data to be sent by a data radio bearer of the supporting UE further included in the MAC PDU, determine a corresponding data radio bearer of the supporting UE according to a LCID corresponding to the data radio bearer of the supporting UE, and send the data corresponding to the data radio bearer of the supporting UE to the corresponding data radio bearer of the supporting UE.

In an eleventh possible implementation by combining the fifth aspect or any possible implementation of the fifth aspect, the selecting and sending module is specifically configured to send the data in the MAC PDU to the benefitted UE through the short-range communication link as follows: forward the data in the MAC PDU to the benefitted UE through a UE in the cooperative group other than the supporting UE and the benefitted UE.

A sixth aspect provides a user equipment UE being a benefitted UE, including:

a receiving module, configured to receive a data packet sent by a supporting UE through a short-range communication link, where the data packet consists of data in a media access control packet data unit MAC PDU sent by a base station to the supporting UE, the data packet includes data to be sent by a data radio bearer of the benefitted UE and an identifier corresponding to the data radio bearer, the benefitted UE and the supporting UE are UEs in a closed cooperative group, each data radio bearer of each UE in the cooperative group corresponds to a logical channel identifier LCID, and the LCID is unique in the cooperative group; and an acquiring module, configured to acquire, according to the identifier corresponding to the data radio bearer, the data in the data packet received by the receiving module.

In a first possible implementation of the sixth aspect, the receiving module is specifically configured to receive the data packet sent by the supporting UE as follows: receive the MAC PDU sent by the supporting UE; or receive the data packet sent by the supporting UE, where the data packet is a data packet formed by using the data to be sent by the data radio bearer of the benefitted UE and the identifier corresponding to the data radio bearer after the supporting UE demultiplexes the MAC PDU.

In a second possible implementation by combining the sixth aspect or the first possible implementation of the sixth aspect, the receiving module is specifically configured to receive the data packet further including data to be sent by a signalling radio bearer, where each signalling radio bearer of the each UE in the cooperative group corresponds to a unique LCID.

A seventh aspect provides a base station, including:

a processor, configured to select a benefitted user equipment UE, where the benefitted UE and a supporting UE are UEs in a closed cooperative group, each data radio bearer of each UE in the cooperative group corresponds to a logical channel identifier LCID, and the LCID is unique in the cooperative group; and generate a media access control packet data unit MAC PDU, where the MAC PDU includes data to be sent by a data radio bearer of the benefitted UE and a LCID corresponding to the data radio bearer of the benefitted UE; and a transmitter, configured to send the MAC PDU to the supporting UE.

In a first possible implementation of the seventh aspect, the processor is further configured to take all the UEs in the cooperative group as a whole, and perform scheduling ranking on the cooperative group with other UEs under the base station other than all the UEs in the cooperative group, and select the cooperative group;

the processor is specifically configured to select the benefitted UE as follows: select one or more benefitted UEs in the cooperative group;

the processor is specifically configured to generate the MAC PDU as follows: select the data from each data radio bearer of one or more benefitted UEs, and generate the MAC PDU by using the data.

In a second possible implementation by combining the first possible implementation of the seventh aspect, the processor is specifically configured to take all the UEs in the cooperative group as a whole and perform scheduling ranking on the cooperative group with other UEs under the base station other than all the UEs in the cooperative group as follows: take a value of (a maximum channel quality indicator CQI in the cooperative group÷an average rate AR of the cooperative group)×the number of all the UEs in the cooperative group as a scheduling ranking value of the cooperative group, and perform scheduling ranking on the cooperative group with other UEs under the base station other than all the UEs in the cooperative group.

In a third possible implementation of the seventh aspect, the processor is specifically configured to select the benefitted UE as follows: perform scheduling ranking on all the UEs under the base station, and select, by the base station, one benefitted UE;

the processor is specifically configured to generate the MAC PDU as follows: select, by the base station, the data from the data radio bearer of the one benefitted UE, and generate the MAC PDU by using the data.

In a fourth possible implementation by combining the seventh aspect or any possible implementation of the seventh aspect, the processor is further configured to incorporate data to be sent by a signalling radio bearer of the benefitted UE and/or the supporting UE in the MAC PDU, where each signalling radio bearer of the each UE in the cooperative group corresponds to a unique LCID.

In a fifth possible implementation by combining the seventh aspect or any of the first to the third possible implementations of the seventh aspect, the processor is further configured to incorporate data to be sent by a signalling radio bearer of the supporting UE in the MAC PDU, where a same signalling radio bearer of all the UEs in the cooperative group corresponds to a same LCID.

In a sixth possible implementation by combining the seventh aspect or any possible implementation of the seventh aspect, the processor is further configured to incorporate a MAC control element CE of the supporting UE and/or data to be sent by a data radio bearer of the supporting UE in the MAC PDU.

An eighth aspect provides a user equipment being a supporting UE, including:

a receiver circuit, configured to receive a media access control packet data unit MAC PDU sent by a base station, where the MAC PDU includes data to be sent by a data radio bearer and a logical channel identifier LCID corresponding to the data radio bearer, the data radio bearer is a data radio bearer of a benefitted user equipment UE, the benefitted UE and the supporting UE are UEs in a closed cooperative group, each data radio bearer of each UE in the cooperative group corresponds to a unique LCID;

a processor, configured to acquire the LCID corresponding to the data radio bearer and the data of the data radio bearer in the MAC PDU received by the receiver circuit; and a transmitter circuit, configured to send the data in the MAC PDU, acquired by the processor, to the benefitted UE through a short-range communication link.

In a first possible implementation of the eighth aspect, the transmitter circuit is specifically configured to send the data in the MAC PDU to the benefitted UE through the short-range communication link as follows: directly send the MAC PDU to the benefitted UE through the short-range communication link; or the processor is further configured to demultiplex the data to be sent by the data radio bearer in the MAC PDU, generate a new data packet by using the data to be sent by the data radio bearer, where the new data packet includes the data to be sent by the data radio bearer in the MAC PDU and an identifier corresponding to the data radio bearer; and the transmitter is specifically configured to send the data in the MAC PDU to the benefitted UE through the short-range communication link as follows: send one or more new data packets to one or more benefitted UEs through the short-range communication link.

In a second possible implementation by combining the first possible implementation of the eighth aspect, the processor is specifically configured to generate the new data packet as follows: take a LCID corresponding to the data radio bearer in the MAC PDU as the identifier corresponding to the data radio bearer, and generate the new data packet by using the LCID corresponding to the data radio bearer in the MAC PDU.

In a third possible implementation by combining the first or the second possible implementation of the eighth aspect, the processor is specifically configured to generate the new data packet as follows: generating a plurality of new data packets corresponding to the plurality of the benefitted UEs by using data to be sent by a plurality of data radio bearers of a plurality of benefitted UEs included in the MAC PDU; or the processor is specifically configured to generate the new data packet as follows: generate one new data packet by using data to be sent by a plurality of data radio bearers of a plurality of benefitted UEs included in the MAC PDU.

In a fourth possible implementation by combining the eighth aspect or any possible implementation of the eighth aspect, the processor is further configured to detect the LCID in the MAC PDU, and determine, according to the LCID in the MAC PDU, the benefitted UE to which the data radio bearer corresponding to the LCID in the MAC PDU belongs;

the transmitter is specifically configured to send the data in the MAC PDU, acquired by the processor, to the benefitted UE through the short-range communication link as follows: send the data to be sent by the data radio bearer corresponding to the LCID in the MAC PDU to the benefitted UE through the short-range communication link.

In a fifth possible implementation by combining the fourth possible implementation of the eighth aspect, the user equipment further includes:

a storage, configured to store a correspondence between each UE in the cooperative group and the LCID of the each UE;

the processor is specifically configured to determine, according to the LCID in the MAC PDU, the benefitted UE to which the data radio bearer corresponding to the LCID in the MAC PDU belongs as follows: determine, according to the correspondence stored in the storage, the benefitted UE corresponding to the LCID in the MAC PDU.

In a sixth possible implementation by combining the eighth aspect or any possible implementation of the eighth aspect, the processor is specifically configured to determine, according to the LCTD in the MAC PDU, the benefitted UE to which the data radio bearer corresponding to the LCTD in the MAC PDU belongs as follows: detect the LCID in the MAC PDU, and determine, according to the LCID in the MAC PDU, that the data radio bearer corresponding to the LCID in the MAC PDU does not belong to the supporting UE;

the transmitter is specifically configured to send the data in the MAC PDU, acquired by the processor, to the benefitted UE through the short-range communication link as follows: broadcast the data in the MAC PDU or the MAC PDU in the cooperative group through the short-range communication link, so that the benefitted UE receives the data in the MAC PDU.

In a seventh possible implementation by combining the eighth aspect or any possible implementation of the eighth aspect, the processor is further configured to demultiplex the MAC PDU, acquire data to be sent by a signalling radio bearer of the supporting UE included in the MAC PDU; reserve the data to be sent by the signalling radio bearer of the supporting UE in the MAC PDU; and/or the processor is further configured to demultiplex the MAC PDU, acquire data to be sent by a signalling radio bearer of the benefitted UE included in the MAC PDU; the transmitter is specifically configured to send the data in the MAC PDU to the benefitted UE through the short-range communication link as follows: send the data to be sent by the signalling radio bearer of the benefitted UE and the data to be sent by the data radio bearer of the benefitted UE in the MAC PDU to the benefitted UE through the short-range communication link;

where each signalling radio bearer of the each UE in the cooperative group corresponds to a LCID, and the LCID corresponding to each signalling radio bearer is unique in the cooperative group.

In an eighth possible implementation by combining the eighth aspect or any of the first to the sixth possible implementations of the eighth aspect, the processor is further configured to demultiplex the MAC PDU, acquire data corresponding to a signalling radio bearer of the supporting UE included in the MAC PDU, reserve the data to be sent by the signalling radio bearer in the MAC PDU, where a same signalling radio bearer of each the UE in the cooperative group corresponds to a same LCID.

In a ninth possible implementation by combining the eighth aspect or any possible implementation of the eighth aspect, the processor is further configured to demultiplex the MAC PDU, acquire a MAC control element CE included in the MAC PDU, reserve the MAC CE in the MAC PDU, where the MAC CE is a MAC CE of the supporting UE.

In a tenth possible implementation by combining the eighth aspect or any possible implementation of the eighth aspect, the processor is further configured to demultiplex the MAC PDU, acquire data to be sent by the data radio bearer of the supporting UE further included in the MAC PDU, determine a corresponding data radio bearer of the supporting UE according to a LCID corresponding to the data radio bearer of the supporting UE, and send the data corresponding to the data radio bearer of the supporting UE to the corresponding data radio bearer of the supporting UE.

In an eleventh possible implementation by combining the eighth aspect or any possible implementation of the eighth aspect, the transmitter is specifically configured to send the data in the MAC PDU to the benefitted UE through the short-range communication link as follows: forward the data in the MAC PDU to the benefitted UE through a UE in the cooperative group other than the supporting UE and the benefitted UE.

A ninth aspect provides a user equipment UE being a benefitted UE, including:

a receiver circuit, configured to receive a data packet sent by a supporting UE through a short-range communication link, where the data packet consists of data in a media access control packet data unit MAC PDU sent by a base station to the supporting UE, the data packet includes data to be sent by a data radio bearer of the benefitted UE and an identifier corresponding to the data radio bearer, the benefitted UE and the supporting UE are UEs in a closed cooperative group, each data radio bearer of each UE in the cooperative group corresponds to a logical channel identifier LCID, and the LCID is unique in the cooperative group; and a processor, configured to acquire, according to the identifier corresponding to the data radio bearer, the data in the data packet.

In a first possible implementation of the ninth aspect, the receiver circuit is specifically configured to receive the data packet sent by the supporting UE as follows: receive the MAC PDU sent by the supporting UE; or receive the data packet sent by the supporting UE, where the data packet is a data packet formed by using the data to be sent by the data radio bearer of the benefitted UE and the identifier corresponding to the data radio bearer after the supporting UE demultiplexes the MAC PDU.

In a second possible implementation by combining the ninth aspect or the first possible implementation of the ninth aspect, the receiver circuit is specifically configured to receive the data packet further including data to be sent by a signalling radio bearer, where each signalling radio bearer of the each UE in the cooperative group corresponds to a unique LCID.

In the above technical solutions, all DRBs of all the UEs or all radio bearers of all the UEs correspond to different LCIDs, so that data in the MAC PDU can uniquely correspond to one DRB or RB of one UE, and the UE can determine, after receiving the MAC PDU, whether it is its own data or determine the data belongs to which DRB or RB of which UE, thereby achieving a method of multiple UEs cooperative communication for synthesizing on the MAC layer.

BRIEF DESCRIPTION OF DRAWINGS

To illustrate the technical solutions of the present invention more clearly, the accompanying drawings used in description of the embodiments of the present invention will be introduced in brief hereinafter. Apparently, the accompanying drawings illustrate only some exemplary embodiments of the invention, and persons skilled in the art can derive other drawings from them without creative efforts.

FIG. 7 is a schematic diagram of a method for transmitting downlink data in multiple UEs cooperative communication according to another embodiment of the invention;

FIG. 8 is a schematic diagram of an implementation of sending a data packet according to another embodiment of the invention;

DESCRIPTION OF EMBODIMENTS

Figure 1:
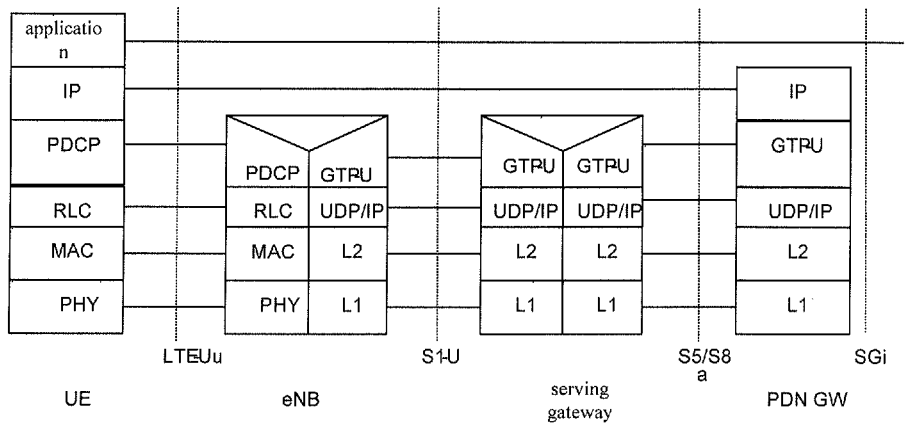
FIG. 1 is a structural schematic diagram of a user-plane bearer protocol stack in a LTE network according to the prior art.

In order to make the objects, technical solutions and advantages of embodiments of the present invention clearer, the technical solutions in the embodiments of the present invention are hereinafter described clearly with reference to the accompanying drawings in the embodiments of the present invention. Obviously, the embodiments described here are a part of the embodiments of the present invention and not all of the embodiments. All other embodiments obtained by persons skilled in the art on the basis of the embodiments of the present invention described here without any creative efforts fall within the scope of the invention.

The cooperative communication relationship can be established among UEs according to the feature that at least two UEs support WiFi and LTE at the same time. For example, a first UE needs to send or receive data, and one or more second UEs can support the first UE and assist the communication of the first UE, so that reliability and throughput rate can be increased. The first UE is referred to as "an benefitted UE", and the second UE for supporting the first UE is referred to as "an supporting UE". All the supporting UEs and the benefitted UEs are within a short-range connection range. In terms of downlink data, the network can send downlink data of a benefitted UE to a base station along a core network bearer of the benefitted UE, and then the base station can send the downlink data to one of these UEs. One method of cooperative communication is that, if the base station ranks UEs according to a scheduling ranking algorithm and determines to schedule the benefitted UE, the base station sends the downlink data of the benefitted UE to a UE with the current best radio link condition among these UEs. If the UE with the current best radio link condition is a supporting UE, the supporting UE sends the downlink data of the benefitted UE to the benefitted UE through WiFi, and thus the cooperative communication between the UEs can be accomplished. If the UE with the current best radio link condition is the benefitted UE, of course, the downlink data can be directly sent to the benefitted UE, and the benefitted UE can perform the data merging process after receiving the data. Similarly, uplink data also can be sent to the network through the benefitted UE itself or the supporting UE, and then the data is merged by the base station, so that the cooperative communication between the UEs can be accomplished. In particular, the supporting UE is a UE in charge of transferring data. In terms of a certain radio bearer, there can be a plurality of supporting UEs, but only one benefitted UE in general. The benefitted UE is the sender of data or the final receiver and user of data. Therefore, the data corresponding to a radio bearer of a benefitted UE can be transmitted by a plurality of supporting UEs (including the benefitted UE itself).

It can be seen from the above method of cooperative communication that, the UE selected by scheduling ranking and the UE as the actual receiver of data in the air interface may not be the same UE.

The UE selected by scheduling ranking is referred to as a "pre-scheduled UE" in the present invention, namely a "benefitted UE". The "supporting UE" is also referred to as an "actually-scheduled UE". In terms of the "actually-scheduled UE", the base station schedules the C-RNTI of the actually-scheduled UE on the PDCCH, so that the actually-scheduled UE can receive the data of the pre-scheduled UE on the PDSCH.

In embodiments of the present invention, the benefitted UE also can be referred to as a benefited or a served UE, the supporting UE also can be referred to as a supporting UE or a serving UE, the above naming of the UE is only an example of the present invention, and naming of the UE in the present invention includes, but not limited to, the above example. Taking the supporting UE and benefited UE as examples, the benefited UE can be the final sender of uplink data or the final receiver of downlink data (from the point of the cellular). In terms of a certain bearer, there is only one in general, and the supporting UE is a UE for supporting the benefited UE for transferring data. In terms of a certain bearer of the benefited UE, there can be more.

Taking the supporting UE and benefited UE as examples, the concepts of the benefited UE and the supporting UE come from the point of a bearer of the benefited UE, for example, UE1 and UE2 form MUCC and can communicate with each other cooperatively, in this way, from the point of a certain bearer of the UE1, the UE2 can support the bearer of the UE1, then the UE1 is the benefited UE while the UE2 is the supporting UE. Meanwhile, the UE1 also can support a certain bearer of the UE2, and then from the point of the bearer of the UE2, the UE2 is the benefited UE while the UE1 is the supporting UE.

Taking the supporting UE and benefited UE as examples, when the above UEs are within the same short-range connection range, the network can send downlink data respectively to the supporting UE and benefited UE (an optimized method is that, the UE with the current best radio link condition is always selected to send data in the network scheduling), when the network sends the downlink data to the supporting UE, the supporting UE receiving the data sends the data to the benefited UE again through the short-range communication (e.g., WiFi). Of course, the data also can be directly sent to the benefited UE and merged by the benefited UE. Similarly, uplink data of the benefited UE also can be sent to the network through the benefited UE itself or other supporting UEs, and then the data is merged by the network, so that the cooperative communication between the UEs can be accomplished.

The supporting UE assists communication, so that reliability and throughput rate of the communication of the benefited UE can be increased.

Embodiments of the present invention will be described in details hereinafter, and it should be noted that, various embodiments of the present invention and features of various embodiments may be combined in any combination without conflict.

It should be initially noted that, in embodiments of the present invention, a plurality of UEs form a closed cooperative group, and all the UEs in the cooperative group can assist data transmission with each other. The so-called closed cooperative group is that, data of a first UE in the cooperative group can be forwarded with the cooperation of a second UE in the cooperative group, where the first UE is any UE in the cooperative group, and the second UE is any UE in the cooperative group other than the first UE. Of course, data of the first UE also can be forwarded without the cooperation of other UEs in the cooperative group, but the UE can directly communicate with a network device, however, a UE in the cooperative group will not be supported by a UE outside the cooperative group or a UE in the cooperative group will not support a UE outside the cooperative group for data transmission. Therefore, the closed cooperative group is that, a UE in the cooperative group only can support a UE within the cooperative group for data transmission, and the UE in the cooperative group only can be supported by a UE within the cooperative group. In other words, if data transmission cooperation with each other occurs, the UEs cooperating with each other certainly belong to the same closed cooperative group, and moreover, any UE can be supported by other UEs in the cooperative group for data transmission.

There can be a lot of methods for forming a closed cooperative group, and any of the methods for forming the closed cooperative group can be applied to embodiments of the present invention. For example, the method for forming the closed cooperative group can be that: the UEs trigger the establishment of short-range connection among them through an application layer, interact with each other about respective cellular network information through the short-range connection, and then one or more UEs report acquired cellular network information of other UEs to the cellular network, so that the cellular network can make these UEs form a closed cooperative group. The method for forming the closed cooperative group also can be that: the cellular network tries, according to location information of UEs in the active state, to make a plurality of UEs to form a closed cooperative group, for example, notify the UE to broadcast and listen to short-range connection information, so that the UE can know whether it can establish the short-range communication. Of course, the closed cooperative group also can be formed by other manners, and how to form the closed cooperative group is not limited in embodiments of the present invention.

Further, in an implementation, each radio bearer of each UE in the closed cooperative group corresponds to a unique LCID, and the unique LCID cannot be repeated with the LCID of other radio bearer in the cooperative group, but LCIDs in different cooperative groups can be the same. Therefore, LCIDs corresponding to all the radio bearers of different UEs in the cooperative group cannot be repeated, and one LCID corresponds one-to-one to one radio bearer of one UE. This implementation differs from the prior art in that: in the prior art, LCIDs corresponding to different radio bearers of one UE cannot be repeated, but different UEs can use the same LCID. In embodiments of the present invention, however, not only cannot LCIDs corresponding to different radio bearers of one UE be repeated, but also LCIDs corresponding to radio bearers of different UEs in the cooperative group cannot be repeated. Furthermore, in the prior art, the LCID of SRB is fixed, different LCIDs indicate different types of SRBs, but SRBs of the same type corresponding to different UEs are the same. In this embodiment, the SRB of each UE neither uses the fixed LCID in the prior art, that is, the LCID corresponding to SRB of each UE neither can be repeated. For example, in the prior art, SRB0 fixedly uses a LCID of "00000". However, for the method in this embodiment, there is only one UE in the cooperative group of which the SRB0 fixedly uses the LCID of "00000", SRB0 of other UE cannot use it anymore, but uses other LCIDs assigned by the base station for SRB0 of other UBs. Besides SRB0, LCIDs of other SRBs are also similar. In this implementation, the LCID corresponding to each radio bearer is assigned by the base station for each radio bearer. In particular, the base station can assign the LCID corresponding to each radio bearer when or after the cooperative group is established. Specific implementation is not limited in embodiments of the present invention, as long as the LCID corresponding to each radio bearer can be assigned.

For example, UE1, UE2, UE3 and UE4, i.e., four UEs form a closed cooperative group.

If RB1of UE1corresponds to LCID=1, then UE2, UE3 and UE4 cannot use LCID=1 to correspond to their RBs. If a plurality of UEs each has a plurality of RBs, then the current LCID value may be not enough, and a reserved LCID or a reserved bit of MAC header can be occupied.

In another implementation, all the DRBs of all the UEs in the closed cooperative group each corresponds to a unique LCID of the closed cooperative group, and SRB of each UE still can use the fixed LCID in the prior art, in this way, LCIDs corresponding to all the DRBs of different UEs in the cooperative group cannot be repeated, while LCIDs corresponding to the same SRBs of different UEs can be the same. However, when the base station sends the MAC PDU, one MAC PDU only can include data corresponding to the SRB of one UE, and the one UE is the first UE to receive the MAC PDU from the base station in the cooperative group. In this implementation, the LCID corresponding to each DRB is assigned by the base station for each DRB. In particular, the base station can assign the LCID corresponding to each DRB when or after the cooperative group is established. The LCID corresponding to SRB can use the fixed value in the prior art. Specific implementation is not limited in embodiments of the present invention, as long as the LCID corresponding to each DRB can be assigned.

For another example, UE1, UE2, UE3 and UE4, i.e., four UEs form a closed cooperative group.

If DRB1of UE1corresponds to LCID=1, then UE2, UE3 and UE4 cannot use LCID=1 to correspond to their DRBs. If a plurality of UEs each has a plurality of DRBs, then the current LCID value taking from 1 to 10 may be not enough, and a reserved LCID or a reserved bit of MAC header can be occupied. If UE1, UE2, UE3 and UE4 have established DRBs before forming the closed cooperative group, then after forming the closed cooperative group, the base station needs to re-assign LCIDs for RBs or DRBs having the same LCID, and modify the LCIDs to avoid repetition of them in the cooperative group.

In the above two implementations, in terms of MAC control element (MAC CE) included in the MAC PDU, because a MAC CE in the prior art corresponds to a fixed LCID, in embodiments of the present invention, the fixed LCID corresponding to the MAC CE is constant, when the base station sends the MAC PDU, one MAC PDU only can include the MAC CE of one UE, and the one UE is the first UE to receive the MAC PDU from the base station in the cooperative group, that is, the UE as the actual receiver of data in the air interface.

Figure 2:
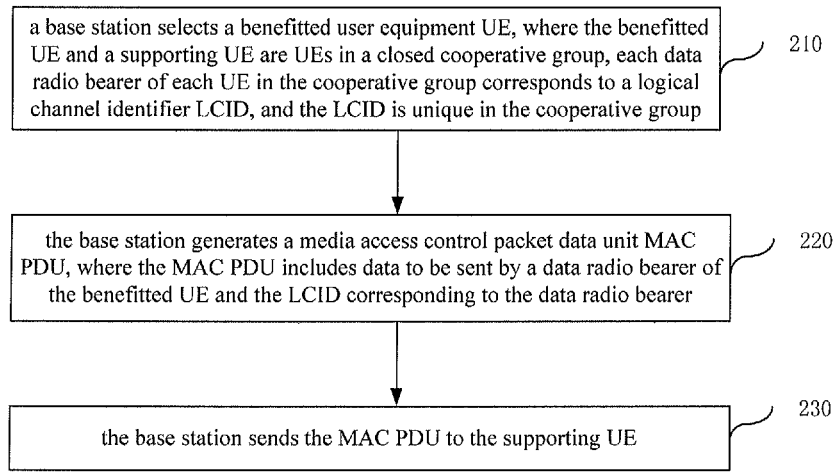
FIG. 2 is a schematic diagram of a method for transmitting downlink data in multiple UEs cooperative communication according to an embodiment of the invention.

On the basis of the above closed cooperative group, an embodiment of the present invention provides a method for transmitting downlink data in multiple UEs cooperative communication, as shown in FIG. 2, the method includes the following steps.

Step 210, a base station selects a benefitted user equipment UE, where the benefitted UE and a supporting UE are UEs in a closed cooperative group, each data radio bearer of each UE in the cooperative group corresponds to a logical channel identifier LCID, and the LCID is unique in the cooperative group.

The "benefitted UE" is a "pre-scheduled UE", and also the first UE hereinafter.

In this step, the base station can select the first UE with various methods, and specific examples below will further describe how the base station selects the first UE.

Step 220, the base station generates a media access control packet data unit MAC PDU, where the MAC PDU includes data to be sent by a data radio bearer of the benefitted UE and the LCID corresponding to the data radio bearer.

Step 230, the base station sends the MAC PDU to the supporting UE.

The "supporting UE" is the "actually-scheduled UE" mentioned above, and also the second UE hereinafter.

In this step, the base station can select the UE with the best channel quality in the cooperative group as the "actually-scheduled UE", and send the MAC PDU to the "actually-scheduled UE". Of course, the base station also can select the "actually-scheduled UE" according to other rules, for example, selecting the UE with the smallest load as the "actually-scheduled UE", etc., and embodiments of the present invention are not limited to selecting the UE with the best channel quality as the "actually-scheduled UE". The UE with the best channel quality can be the UE with the best CQI among CQIs reported by each UE in the cooperative group.

In particular, the base station sending the MAC PDU to the second UE in the closed cooperative group specifically includes: the base station indicates, through a scheduling command scrambled by a C-RNTI of the second UE, the second UE using which MCS on which time domain and frequency domain resource to receive data on a PDSCH, and sends the MAC PDU on the PDSCH, so that the second UE can receive the MAC PDU from the PDSCH.

After receiving the MAC PDU, the second UE can determine a UE corresponding to the LCID according to the LCID included in the MAC PDU, or, after receiving the MAC PDU, the second UE can determine whether the data in the MAC PDU is data sent to itself according to the LCID included in the MAC PDU.

In particular, if only one first UE is selected in step 210, the second UE can be the same UE as the first UE, or any UE other than the first UE in the cooperative group. If a plurality of first UEs are selected in step 210, the second UE can be one of the plurality of first UEs, or any UE other than the plurality of first UEs in the cooperative group.

If the MAC PDU includes only data of the second UE, the second UE reserves the MAC PDU; if the MAC PDU includes data of other UEs in the cooperative group, the second UE forwards the MAC PDU to the one or the plurality of first UEs.

Further, the second UE can directly forward the MAC PDU to the one or the plurality of first UEs, or can forward the MAC PDU to the one or the plurality of first UEs through other intermediate nodes. In particular, the intermediate node can be a UE or an access point (AP) in the cooperative group. The second UE can forward the MAC PDU through a pre-configured mapping relationship between a radio bearer and a route, which can be established in various manners, for example, established when the cooperative group is established, or acquired by message such as radio resource control (RRC) configuration, etc. How to determine the mapping relationship between the radio bearer and the route is not limited in embodiments of the present invention, and all the methods can be applied to embodiments of the present invention.

Through the above method in this embodiment, all DRBs of all the UEs or all radio bearers of all the UEs correspond to different LCIDs, so that the data in the MAC PDU can uniquely correspond to one DRB or RB of one UE, and the UE can determine, after receiving the MAC PDU, whether it is its own data or determine the data belongs to which DRB or RB of which UE, thereby achieving a method of multiple UEs cooperative communication for synthesizing on the MAC layer. In addition, a plurality of UEs can cooperate with each other for data transmission in this method, which has little change to the eNB and improves system performance.

In terms of step 210, the one or the plurality of first UEs can be selected through various implementations. The implementation of step 210 will be described in details hereinafter.

Figure 3:
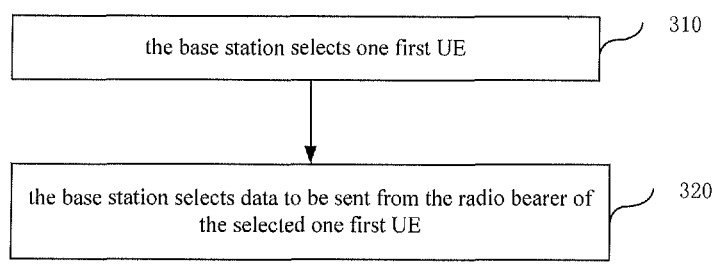
FIG. 3 is a schematic diagram of an implementation of selecting a first UE according to an embodiment of the invention.

In an implementation of step 210, the base station performs scheduling ranking with a granularity of a UE, so as to select one first UE. Specifically, as shown in FIG. 3, this implementation includes the following steps.

Step 310, the base station selects one first UE.

In this step, the base station selects the one first UE with a scheduling ranking algorithm.

The first UE is the "pre-scheduled UE" mentioned above, and the base station can select the "pre-scheduled UE" according to the traditional scheduling ranking algorithm. In particular, the traditional scheduling ranking algorithm can be any scheduling ranking algorithm in the prior art, such as PF algorithm. The base station also can select the best CQI in the cooperative group to be divided by an average rate of the UE to perform ranking.

Step 320, the base station selects data to be sent from the radio bearer of the selected one first UE.

In particular, the base station can select the data to be sent according to any method in the prior art, such as a token bucket algorithm.

In this way, the data to be sent, selected by the base station all can be data corresponding to the DRB of the one first UE. Therefore, in step 220, when the base station generates a MAC PDU by using the data, the data included in the MAC PDU are all data of the one first UE, in particular, the data do not include the MAC CE of the first UE. Further, the base station also can select data to be sent by the second UE, and generate the MAC PDU by using the data to be sent by the second UE. That is, the MAC PDU also can include the data corresponding to the DRB of the second UE in addition to the data corresponding to the DRB of the one first UE.

Further, if each SRB of each UE corresponds to a unique LCID in the closed cooperative group, then the MAC PDU can include data corresponding to the SRB of the one first UE and/or the second UE. If the SRB of each UE does not correspond to a unique LCID in the closed cooperative group, then the MAC PDU only can include the data corresponding to the SRB of the second UE, but cannot include the data corresponding to the SRBs of other UEs. Besides, the MAC PDU also can include the MAC CE of the second UE.

Correspondingly, in step 230, after the base station sends the MAC PDU, the MAC PDU received by the second UE on the PDSCH can include only the data corresponding to the DRB of the one first UE, or can also include one or more of the MAC CE of the second UE, the data corresponding to the SRB of the second UE and the data corresponding to the DRB of the second UE. If different SRBs of each UE uniquely correspond to a LCID in the closed cooperative group, then the MAC PDU received by the second UE on the PDSCH also can include the data corresponding to the SRB of the first UE.

In terms of the second UE, after receiving the MAC PDU, the second UE detects the LCID in the MAC PDU. If the second UE finds that the MAC PDU does not include data corresponding to the radio bearer of the second UE, but includes only data corresponding to the radio bearer of the one first UE, then the second UE forwards the MAC PDU to the one first UE through a short-range link, and the short-range link is established in advance by each UE in the cooperative group. Further, of course, the MAC PDU can be forwarded to the one first UE through other nodes.

Alternatively, if the second UE finds that the LCID in the MAC PDU is not the LCID corresponding to DRB or SRB assigned to itself, the second UE broadcasts the MAC PDU in the cooperative group through the short-range link, so that the one first UE can receive the broadcast MAC PDU.

Figure 4:
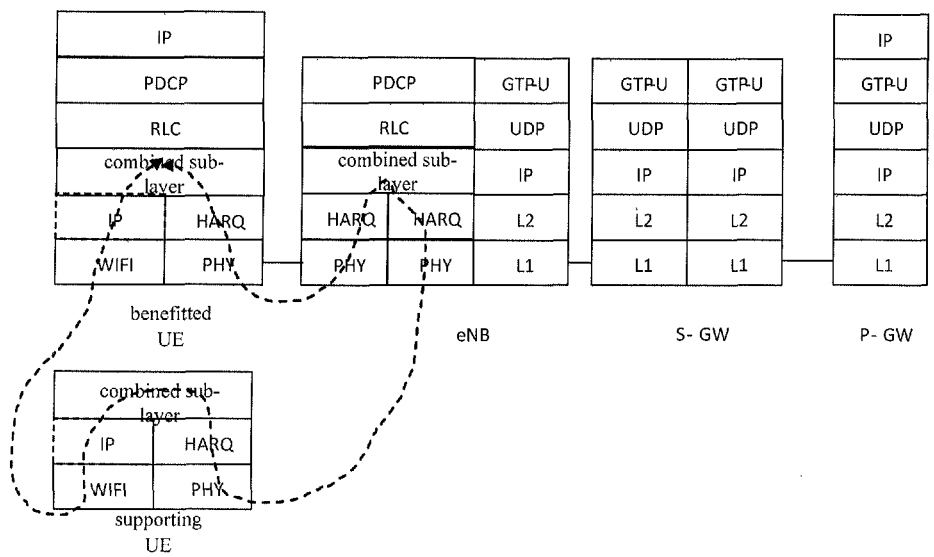
FIG. 4 is a structural schematic diagram of a user-plane bearer protocol stack in a LTE network according to an embodiment of the invention.

In particular, when the second UE forwards the MAC PDU to the one first UE through the short-range link, in an implementation, the second UE can directly forward the MAC PDU received from the base station without any processing to the MAC PDU. In another implementation, the second UE also can make the MAC SDU be processed by a new layer, and then forward the processed data packet to the one first UE, and the new layer is referred to as a "combined sub-layer", as shown in FIG. 4, the "combined sub-layer" can belong to the MAC layer, and can be a higher layer in the MAC layer. Of course, the "combined sub-layer" may not belong to the MAC layer, but may be located between the MAC layer and RLC layer. The "combined sub-layer" processing the MAC PDU includes: the combined sub-layer adds the LCID corresponding to the data of the first UE in a header of the MAC PDU, so that the first UE can send the data included in the MAC PDU to the corresponding RB through corresponding relationship of LCID. Alternatively, the combined sub-layer adds other identifier, which has one-to-one mapping relationship with the DRB or RB corresponding to the data of the first UE, in the header of the MAC PDU, so that the first UE can know the DRB or RB corresponding to the data after a "combined sub-layer" receives the data, and send the data to a corresponding higher layer.

Furthermore, the base station also needs to introduce a "combined sub-layer" in the MAC layer, or between the RLC and MAC, and the "combined sub-layer" is mainly to distribute data, and achieve separation of the "pre-scheduled UE" and the "actually-scheduled UE". The data can be merged on the "combined sub-layer" of the first UE.

It should be noted that, the MAC layer of the second UE at least has functions of HARQ, demultiplexing and mapping from LCID to the RB itself. In particular, the function of mapping from LCID to the radio bearer itself is that, the MAC layer of the second UE can determine whether data therein is data sent to itself; if yes, which radio bearer of the second UE is sent to can also be determined according to the LCID. At this time, when sending data to the benefitted UE, the second UE knows through the LCID that the data does not belong to itself, but does not know the UE corresponding to the data; the second UE sends data to other UEs in the cooperative group by way of broadcasting through the short-range link. In particular, the broadcast data can be the received MAC PDU. Alternatively, when sending data to the first UE, the second UE knows through the LCID that the data does not belong to itself, but does not know the UE corresponding to the data; the combined sub-layer of the second UE adds LCID to the demultiplexed data to form a new data packet, and sends the new data packet to other UEs in the cooperative group by way of broadcasting through the short-range link.

Each of the other UEs receives the broadcast message, identifies whether the data belongs to itself according to LCID information, and reserves the data belonging to itself for further processing and discards the data not belonging to itself.

Further, the MAC layer of the second UE also can have a function of mapping from LCID to the benefitted UE. At this time, the second UE stores corresponding relationship between each UE in the cooperative group and the LCID. In this case, the second UE can determine according to LCID whether data in the MAC PDU is sent to itself or to the benefitted UE, and determine the specific benefitted UE. If MAC layer of the second UE finds that the MAC PDU is not sent to itself, then it can directly send the MAC PDU to the benefitted UE determined according to LCID; or the MAC layer of the second UE demultiplexes the MAC PDU to obtain the MAC SDU therein, and sends the MAC SDU to the combined sub-layer; the combined sub-layer adds the LCID or other identifier corresponding to each MAC SDU before the MAC SDU to form a new data packet, and sends directly or through other UEs or APs the new data packet to the benefitted UE. Of course, in this case, the second UE also can send the new data packet to the UEs in the cooperative group by way of broadcasting through the short-range link, or send the unprocessed MAC PDU out by way of broadcasting. Each of the other UEs receives the broadcast message, identifies whether the data belongs to itself according to LCID information, and reserves the data belonging to itself for further processing and discards the data not belonging to itself.

Of course, if the MAC PDU also carries the MAC CE, the second UE receives the MAC CE, and does not send the MAC CE when sending data to the benefitted UE. When the SRB of each UE has no unique LCID, the data corresponding to the SRB is processed similarly to MAC CE.

Figure 5:
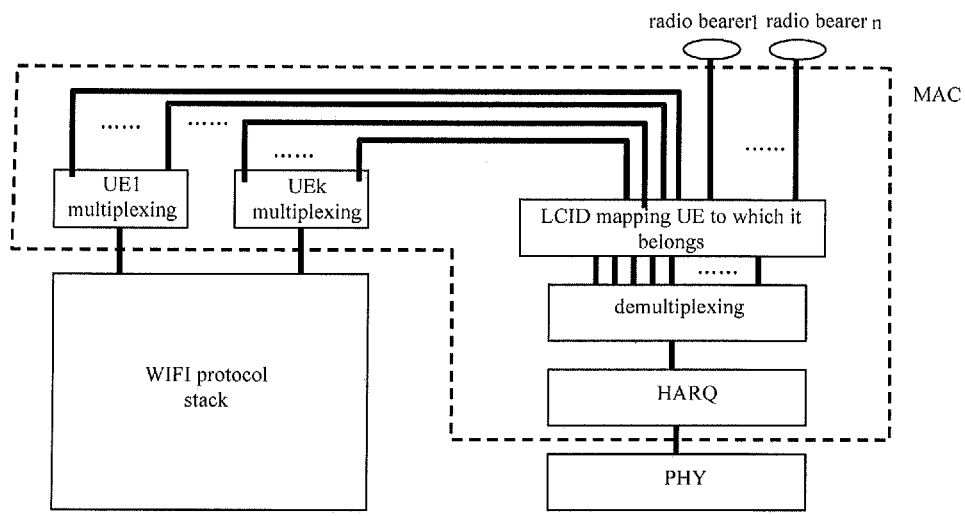
FIG. 5 is a schematic diagram of a MAC layer processing of a second UE according to an embodiment of the invention.

As shown in FIG. 5, the processing procedure of the MAC layer of the second UE includes: after receiving an accurate MAC PDU, the MAC of the second UE demultiplexes the MAC PDU, and obtains LCIDs of DRB, SRB and MAC CE in the MAC PDU; if the LCIDs of DRB and SRB in the MAC PDU are of its own, then sends to the radio bearer of the second UE; if not, then multiplexes the data corresponding to the DRB as a data packet of the corresponding UE.

Figure 6:
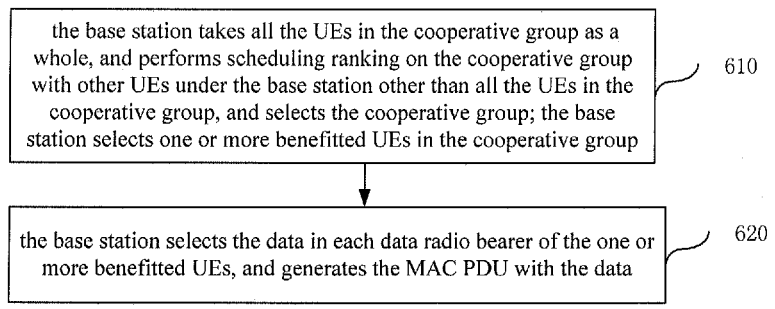
FIG. 6 is a schematic diagram of another implementation of selecting a first UE according to an embodiment of the invention.

In another implementation of step 210, the base station performs scheduling ranking with a granularity of a radio bearer, so as to select a plurality of first UEs. Specifically, as shown in FIG. 6, this implementation includes the following steps.

Step 610, the base station takes all the UEs in the cooperative group as a whole, and performs scheduling ranking on the cooperative group with other UEs under the base station other than all the UEs in the cooperative group, and selects the cooperative group; the base station selects one or more benefitted UEs in the cooperative group.

In this implementation, the traditional scheduling ranking algorithm also can be used during scheduling ranking. Different from the above implementation, the base station takes the cooperative group as a whole when performing the scheduling ranking, that is, takes the cooperative group as one UE, and performs ranking on the cooperative group together with other UEs under the base station other than the cooperative group.

Preferably, considering that the cooperative group consisted by a plurality of UEs certainly will have a higher AR when the cooperative group is taken as one UE to be ranked together with other UEs under the base station, resulting in a small value of maximum CQI in the cooperative group/AR of the cooperative group and a lower ranking of the cooperative group, therefore, the cooperative group is at a disadvantage in the ranking. Preferably, for purpose of fairness, when taking the cooperative group as a whole and performing ranking on the cooperative group together with other UEs under the base station, this implementation can further modify corresponding scheduling ranking algorithm, such as modifying on the basis of the existing PF algorithm.

The specific modification is that, take a value of ((the maximum CQI in the cooperative group÷an AR of the cooperative group)×the number of group members) as a ranking value of the cooperative group, and perform scheduling ranking on the cooperative group with respective value of CQI/AR of other UEs. In this way, when the cooperative group participates in scheduling ranking as "one UE", because the value of (the maximum CQI in the cooperative group/an AR of the cooperative group) is multiplied by the number of group members, the priority of the cooperative group is improved and fairness of other UEs also can be guaranteed.

Step 620, the base station selects the data from each data radio bearer of the one or more benefitted UEs, and generates the MAC PDU by using the data.

When selecting the cooperative group as a "pre-scheduled UE", the base station selects data to be sent from the data radio bearer of each UE in the cooperative group, and generates the MAC PDU in step 220. The MAC PDU consists of data selected from each RB of each UE in the cooperative group. Therefore, the MAC PDU may include data of a plurality of first UEs. For example, the MAC PDU may include the MAC SDU of RB1 of UE1, or also includes the MAC SDU of RB2 of UE2, or the like. Of course, the MAC PDU may include only the data of one first UE. At this time, the second UE can be one of the plurality of first UEs.

In step 230, the base station also can select the UE with the best channel quality in the cooperative group, i.e., the second UE, as the "actually-scheduled UE" to send the MAC PDU, and specific scheduling method can be obtained with reference to descriptions in the above embodiment, which will not be described again here. It should be noted that, in this implementation, the MAC CE in the MAC PDU only can be the MAC CE for the second UE, and the second UE cannot forward the MAC CE of other UEs.

After receiving the MAC PDU, the second UE processes the MAC PDU, such as PHY reception and HARQ feedback. Then, the UE corresponding to the data in the MAC PDU is identified through the LCID in the MAC PDU in the process of demultiplexing. If the MAC PDU includes the MAC CE of the second UE, the second UE will process by itself the MAC CE belonging to itself. If the MAC PDU includes the MAC SDU of the second UE, the second UE transfers the MAC SDU to a higher layer (such as RLC) corresponding to the LCID of the MAC SDU. If the MAC PDU also includes data of the first UE in the cooperative group, the second UE respectively sends the MAC SDU not belonging to itself to a corresponding first UE. After receiving the MAC SDU sent by the second UE, the first UE identifies the radio bearer of the first UE corresponding to the MAC SDU again through the LCID, and transfers the data to a higher layer. Of course, if the LCID corresponding to the SRB is not unique in the cooperative group, the data corresponding to the SRB is processed similarly to the MAC CE.

It should be noted that, the MAC layer of the second UE at least has functions of HARQ, demultiplexing and mapping from LCID to the RB itself. In particular, the function of mapping from LCID to the radio bearer itself is that, the MAC layer of the second UE can determine whether data therein is data sent to itself; if yes, which radio bearer of the second UE is sent to can also be determined according to the LCID. At this time, when sending data to the first UE, the second UE knows through the LCID that the data does not belong to itself, but does not know the UE corresponding to the data; the second UE sends data to other UEs in the cooperative group by way of broadcasting through the short-range link. In particular, the broadcast data can be the received MAC PDU. Alternatively, when sending data to the first UE, the second UE knows through the LCID that the data does not belong to itself, but does not know the UE corresponding to the data; the combined sub-layer of the second UE adds LCID or other identifier to the demultiplexed data to form new data packet, and sends the new data packet to other UEs in the cooperative group by way of broadcasting through the short-range link. Each of the other UEs receives the broadcast message, identifies whether the data belongs to itself according to the LCID or other identifier information, and reserves the data belonging to itself for further processing and discards the data not belonging to itself.

Further, the MAC layer of the second UE also can have a function of mapping from LCID to the benefitted UE. At this time, the second UE stores corresponding relationship between each UE in the cooperative group and the LCID. In this case, the second UE can determine according to LCID whether data in the MAC PDU is sent to itself or to the benefitted UE, and determine the specific benefitted UE. If MAC layer of the second UE finds that the MAC PDU is not sent to itself, then it can directly send the MAC PDU to the benefitted UE determined according to LCID; or the MAC layer of the second UE demultiplexes the MAC PDU to obtain the MAC SDU therein, and sends the MAC SDU to the combined sub-layer; the combined sub-layer adds the LCID or other identifier corresponding to each MAC SDU before the MAC SDU to form a new data packet, and sends directly or through other UEs or APs the new data packet to the benefitted UE. Of course, in this case, the second UE also can send the new data packet to the UEs in the cooperative group by way of broadcasting through the short-range link, or send the unprocessed MAC PDU out by way of broadcasting. Each of the other UEs receives the broadcast message, identifies whether the data belongs to itself according to LCID information, and reserves the data belonging to itself for further processing and discards the data not belonging to itself.

Of course, if the MAC PDU also carries the MAC CE, the second UE receives the MAC CE, and does not send the MAC CE when sending data to the benefitted UE. When the SRB of each UE has no unique LCID, the data corresponding to the SRB is processed similarly to MAC CE.

It can be seen from the above implementation that, the MAC layer can be divided into two logic sub-layers, i.e., a HARQ sub-layer and a higher layer in the MAC layer in embodiments of the present invention. In embodiments of the present invention, the new higher-layer in the MAC layer is a "combined sub-layer" (Int-Layer). The combined sub-layer may have a function different from an ordinary MAC higher layer. For example, the "combined sub-layer" has a function to repack the LCID or corresponding other identifier to a new data packet, and the new data packet can have a format the same with or different from the existing MAC PDU format. If different, a new protocol stack can be: the combined sub-layer in the base station performs scheduling, ranking and packeting functions, that is, making the MAC SDUs sent to different UEs form a new data packet, as described above, in the scheduling with a granularity of a UE, the new data packet belongs to one UE; in the scheduling with a granularity of a radio bearer, the new data packet includes MAC SDUs of a plurality of UEs. If the supporting UE directly receives data from the base station, the supporting UE will perform the HARQ process, and then transfer data to the combined sub-layer, and the combined sub-layer of the UE performs the packetizing function, that is, determines, according to the LCID, whether to send the data to the higher layer in the MAC layer for processing or to its own higher layer of the traditional MAC layer (such as MAC CE) for processing, or send the data to the corresponding benefitted UE, and the benefitted UE directly sends the data received through the short-range communication to the combined sub-layer for processing. In particular, the combined sub-layer of the supporting UE can form a new data packet with MAC SDUs sent to the benefitted UE, or can form respective new data packet for each UE, that is, one new data packet includes only data of one UE. The combined sub-layer of the benefitted UE sends the data to its own higher layer for processing according to the LCID or corresponding identifier of the UE. Through the above method, multiple UEs cooperative communication can be achieved.

The above method is introduced taking LTE cellular network as an example, and also can be applied to other cellular networks such as 2G/3G, WiMAX and CDMA etc. Taking WiFi as an example of short-range communication, other short-range communication modes, such as BlueTooth and ZigBee etc. also can be used. The short-range communication even can select different modes at the same time. For example, WiFi is used for the communication of UE1 to UE2, and ZigBee is used for the communication of UE2 to UE3. Specific embodiments for other networks are not repeated herein, because the principles thereof are the same.

Another embodiment of the present invention provides a method for transmitting downlink data in multiple UEs cooperative communication, the method in this embodiment is a method embodiment of the supporting UE corresponding to the above method embodiment of the base station side, and specific content can be obtained with reference to descriptions in the above embodiment. As shown in FIG. 7, the method includes the following steps.

Step 710, a supporting user equipment UE receives a media access control packet data unit MAC PDU sent by a base station, where the MAC PDU includes data to be sent by a data radio bearer and a logical channel identifier LCID corresponding to the data radio bearer, the data radio bearer is a data radio bearer of a benefitted UE, the benefitted UE and the supporting UE are UEs in a closed cooperative group, each data radio bearer of each UE in the cooperative group corresponds to a LCID, and the LCID is unique in the cooperative group; and Step 720, the supporting UE sends, according to the LCID corresponding to the data radio bearer in the MAC PDU, the data in the MAC PDU to the benefitted UE through a short-range communication link.

Through the above method in this embodiment, all DRBs of all the UEs or all radio bearers of all the UEs correspond to different LCIDs, so that data in the MAC PDU can uniquely correspond to one DRB or RB of one UE, and the UE can determine, after receiving the MAC PDU, whether it is its own data or determine the data belongs to which DRB or RB of which UE, thereby achieving a method of multiple UEs cooperative communication for synthesizing on the MAC layer. In addition, a plurality of UEs can cooperate with each other for data transmission in the method, which has little change to the eNB and improves system performance.

Specific content can be obtained with reference to descriptions in the above embodiment.

Further, step 720 can include: the supporting UE directly sends the MAC PDU to the benefitted UE through the short-range communication link.

Or, as shown in FIG. 8, step 720 can include:

Step 7201, the supporting UE demultiplexes the data to be sent by the data radio bearer in the MAC PDU, and generates a new data packet, where the new data packet includes the data to be sent by the data radio bearer in the MAC PDU and an identifier corresponding to the data radio bearer.

The generating one or more new data packets can include:

generating a plurality of new data packets corresponding to the plurality of the benefitted UEs by using data to be sent by a plurality of data radio bearers of a plurality of benefitted UEs included in the MAC PDU; or generating one new data packet by using data to be sent by a plurality of data radio bearers of a plurality of benefitted UEs included in the MAC PDU.

Step 7202, the supporting UE sends the new data packet to the benefitted UE through the short-range communication link, the new data packet includes the data and a LCID corresponding to the data radio bearer.

Figure 9:
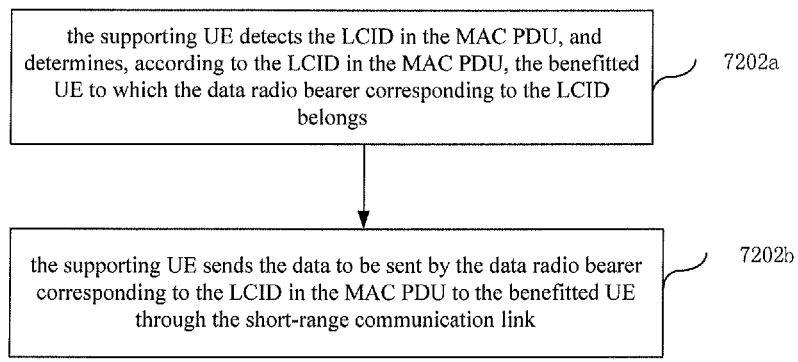
FIG. 9 is a schematic diagram of another implementation of sending a data packet according to another embodiment of the invention.

In particular, as shown in FIG. 9, step 7202 can include:

Step 7202a, the supporting UE detects the LCID in the MAC PDU, and determines, according to the LCID in the MAC PDU, the benefitted UE to which the data radio bearer corresponding to the LCID belongs;

Step 7202b, the supporting UE sends the data to be sent by the data radio bearer corresponding to the LCID in the MAC PDU to the benefitted UE through the short-range communication link.

In step 7202b, the supporting UE determines the benefitted UE corresponding to the LCID in the MAC PDU according to a pre-stored correspondence between each UE in the cooperative group and the LCID of the each UE.

Figure 10:
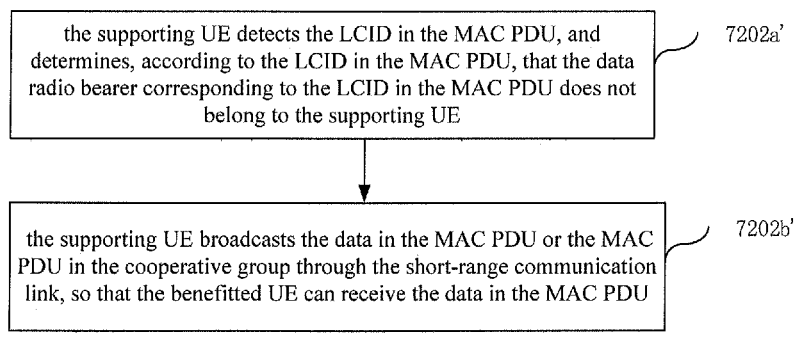
FIG. 10 is a schematic diagram of another implementation of sending a data packet according to another embodiment of the invention.

Or, as shown in FIG. 10, step 7202 can include:

Step 7202a', the supporting UE detects the LCID in the MAC PDU, and determines, according to the LCID in the MAC PDU, that the data radio bearer corresponding to the LCID in the MAC PDU does not belong to the supporting UE;

Step 7202b', the supporting UE broadcasts the data in the MAC PDU or the MAC PDU in the cooperative group through the short-range communication link, so that the benefitted UE can receive the data in the MAC PDU.

Through the above method, the supporting UE in this embodiment, namely the second UE, sends the data in the MAC PDU to the benefitted UE, namely the first UE through a short-range communication link according to the LCID corresponding to the data radio bearer in the MAC PDU, so that a plurality of UEs can cooperate with each other for data transmission, which has little change to the eNB and improves system performance.

Further, the MAC PDU also includes data to be sent by a signalling radio bearer of the benefitted UE;

In this case, the supporting UE sends the data in the MAC PDU to the benefitted UE through the short-range communication link, which can include: the supporting UE sends the data to be sent by the signalling radio bearer of the benefitted UE and the data to be sent by the data radio bearer of the benefitted UE in the MAC PDU to the benefitted UE through the short-range communication link; and/or the MAC PDU further includes data to be sent by a signalling radio bearer of the supporting UE; after the supporting UE receives the MAC PDU sent by the base station, the method further includes: the supporting UE reserves the data to be sent by the signalling radio bearer of the supporting UE in the MAC PDU.

Figure 11:
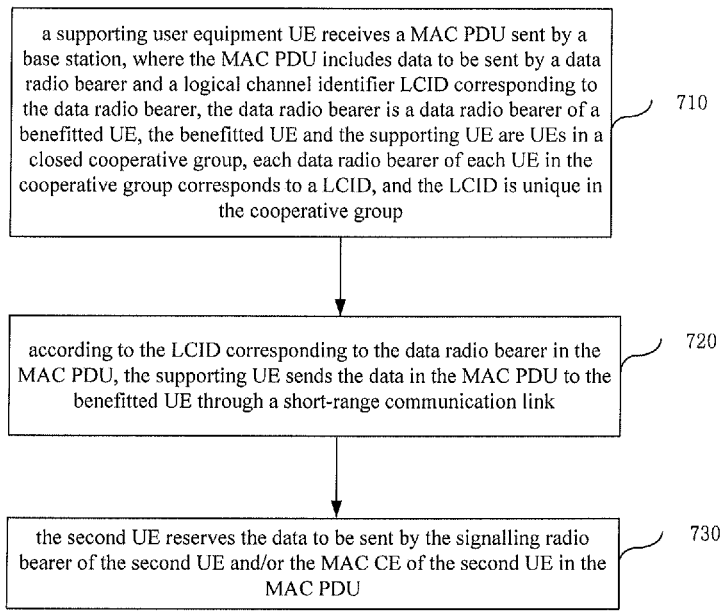
FIG. 11 is a schematic diagram of a method for transmitting downlink data in multiple UEs cooperative communication according to another embodiment of the invention.

Or, further, the MAC PDU further includes data to be sent by a signalling radio bearer, the signalling radio bearer is a signalling radio bearer of the supporting UE, and the same signalling radio bearer of all the UEs in the cooperative group corresponds to the same LCID;

As shown in FIG. 11, after the supporting UE receives the MAC PDU sent by the base station, the method further includes:

Step 730, the supporting UE reserves the data to be sent by the signalling radio bearer of the supporting UE in the MAC PDU.

Further, the MAC PDU further includes a MAC control element CE, and the MAC CE is a MAC CE of the supporting UE;

At this time, step 730 includes: the supporting UE reserves the MAC CE of the supporting UE in the MAC PDU. If the MAC PDU also includes the data to be sent by the signalling radio bearer of the supporting UE, the supporting UE also reserves the data to be sent by the signalling radio bearer of the supporting UE in the MAC PDU.

Further, if the supporting UE detects that the MAC PDU further includes data corresponding to a data radio bearer of the supporting UE, the supporting UE determines a corresponding data radio bearer of the supporting UE according to the LCID corresponding to the data radio bearer of the supporting UE.

The supporting UE sending the data in the MAC PDU to the benefitted UE can include: the supporting UE sends the data in the MAC PDU to the benefitted UE through a UE in the cooperative group other than the supporting UE and the benefitted UE.

Through the above method, the supporting UE in this embodiment, namely the second UE, not only can forward data of one or more first UEs, but also can receive one or more of the data corresponding to its own SRB, the MAC CE and the data corresponding to the DRB in the MAC PDU, thereby improving efficiency of data transmission.

Figure 12:
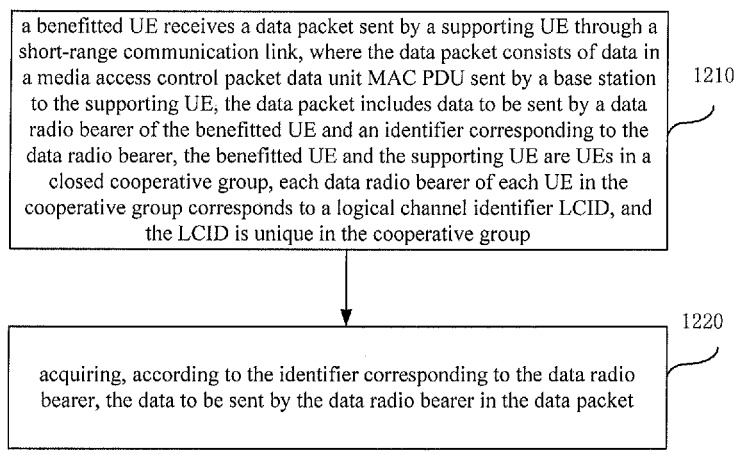
FIG. 12 is a schematic diagram of a method for transmitting downlink data in multiple UEs cooperative communication according to another embodiment of the invention.

Another embodiment of the present invention provides a method for transmitting downlink data in multiple UEs cooperative communication, the method in this embodiment is a method embodiment of the benefitted UE corresponding to the above method embodiment of the base station side, and specific content can be obtained with reference to descriptions in the above embodiment. As shown in FIG. 12, the method includes the following steps.

Step 1210, a benefitted UE receives a data packet sent by a supporting UE through a short-range communication link, where the data packet consists of data in a media access control packet data unit MAC PDU sent by a base station to the supporting UE, the data packet includes data to be sent by a data radio bearer of the benefitted UE and an identifier corresponding to the data radio bearer, the benefitted UE and the supporting UE are UEs in a closed cooperative group, each data radio bearer of each UE in the cooperative group corresponds to a logical channel identifier LCID, and the LCID is unique in the cooperative group.

The benefitted UE can receive the MAC PDU directly sent by the second UE through a short-range communication link.

Or, the benefitted UE can receive a new data packet including the data corresponding to the data radio bearer of the UE and the identifier corresponding to the data radio bearer, generated after the second UE demultiplexes the MAC SDU.

The identifier of the data radio bearer can be a LCID, or other identifier uniquely determining the data radio bearer.

Step 1220, acquiring, according to the identifier corresponding to the data radio bearer, the data to be sent by the data radio bearer in the data packet.

Through the above method in this embodiment, all DRBs of all the UEs or all radio bearers of all the UEs correspond to different LCIDs, so that the data in the MAC PDU can uniquely correspond to one DRB or RB of one UE, and the UE can communicate with the base station through other UEs in the cooperative group, thereby achieving a method of multiple UEs cooperative communication for synthesizing on the MAC layer.

Further, the MAC PDU may further include data to be sent by a signalling radio bearer of the benefitted UE, where each signalling radio bearer of each UE in the cooperative group corresponds to a LCID, and the LCID corresponding to the each signalling radio bearer is unique in the cooperative group.

In this embodiment, the benefitted UE can receive the data packet sent by the supporting UE by way of broadcasting through the short-range communication link; or, the benefitted UE can receive the data packet forwarded by other UEs in the cooperative group or APs through the short-range communication link.

Through the above method, the benefitted UE in this embodiment, namely the first UE can receive the data packet sent by other UEs in the cooperative group, the data in the data packet is sent by the base station to the benefitted UE, so that a plurality of UEs can cooperate with each other for data transmission, which has little change to the eNB and improves system performance.

Figure 13:
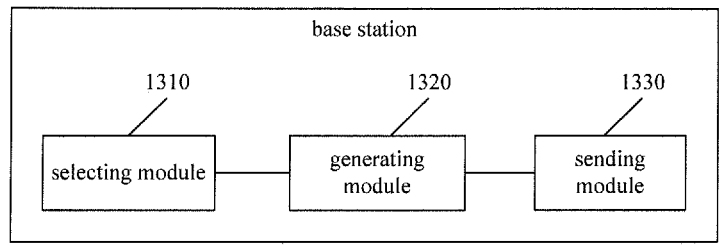
FIG. 13 is a schematic structural diagram of a base station according to an embodiment of the present invention.

On the basis of the methods provided by the above embodiments, this embodiment also provides a base station for performing the methods in the above embodiments, and specific content can be obtained with reference to descriptions in the above embodiments. As shown in FIG. 13, the base station includes: a selecting module 1310, a generating module 1320 and a sending module 1330.

The selecting module 1310 is configured to select a benefitted user equipment UE, where the benefitted UE and a supporting UE are UEs in a closed cooperative group, each data radio bearer of each UE in the cooperative group corresponds to a logical channel identifier LCID, and the LCID is unique in the cooperative group;

the generating module 1320 is configured to generate a media access control packet data unit MAC PDU, where the MAC PDU includes data to be sent by a data radio bearer of the benefitted UE selected by the selecting module 1310 and a LCID corresponding to the data radio bearer, and the sending module 1330 is configured to send the MAC PDU generated by the generating module 1320 to the supporting UE.

Through the above base station, in this embodiment, all DRBs of all the UEs or all radio bearers of all the UEs correspond to different LCIDs, so that the data in the MAC PDU can uniquely correspond to one DRB or RB of one UE, and the UE can determine, after receiving the MAC PDU, whether it is its own data or determine the data belongs to which DRB or RB of which UE, thereby achieving multiple UEs cooperative communication for synthesizing on the MAC layer.

Further, the selecting module 1310 is further configured to take all the UEs in the cooperative group as a whole, and perform scheduling ranking on the cooperative group with other UEs under the base station other than all the UEs in the cooperative group, and select the cooperative group;

the selecting module is specifically configured to select the benefitted UE as follows: select one or more benefitted UEs in the cooperative group;

the generating module 1320 is specifically configured to generate the MAC PDU as follows: select the data from each data radio bearer of the one or more benefitted UEs, and generate the MAC PDU by using the data.

The selecting module 1310 is specifically configured to take all the UEs in the cooperative group as a whole and perform scheduling ranking on the cooperative group with other UEs under the base station other than all the UEs in the cooperative group as follows: take a value of (the maximum channel quality indicator CQI in the cooperative group÷an average rate AR of the cooperative group)×the number of all the UEs in the cooperative group as a scheduling ranking value of the cooperative group, and perform scheduling ranking on the cooperative group with other UEs under the base station other than all the UEs in the cooperative group.

Further, the selecting module 1310 is specifically configured to select the benefitted UE as follows: perform scheduling ranking on all the UEs under the base station, and select, by the base station, one benefitted UE;

the generating module 1320 is specifically configured to generate the MAC PDU as follows: the base station selects the data from the data radio bearer of the one benefitted UE, and generates the MAC PDU by using the data.

Further, the generating module 1320 is further configured to incorporate data to be sent by a signalling radio bearer of the benefitted UE and/or the supporting UE in the MAC PDU, where each signalling radio bearer of each UE in the cooperative group corresponds to a unique LCID.

Further, the generating module 1320 is further configured to incorporate data to be sent by a signalling radio bearer of the supporting UE in the MAC PDU, where the same signalling radio bearer of all the UEs in the cooperative group corresponds to the same LCID.

Further, the generating module 1320 is further configured to incorporate a MAC control element CE of the supporting UE and/or data to be sent by a data radio bearer of the supporting UE in the MAC PDU.

Because the base station in this embodiment can perform the method in the above embodiments, the technical effect obtained can correspond to the method embodiments, and specific content can be obtained with reference to descriptions in the above embodiments, and thus the details will not be described herein again.

Figure 14:
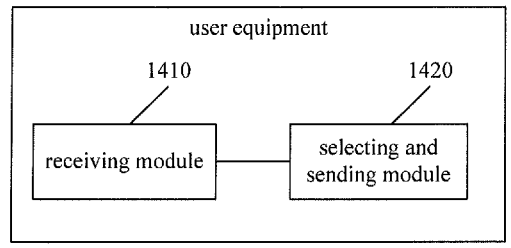
FIG. 14 is a schematic structural diagram of a user equipment according to an embodiment of the present invention.

On the basis of the methods provided by the above embodiments, this embodiment also provides a user equipment for performing the method in the above embodiments. As shown in FIG. 14, the user equipment includes: a receiving module 1410 and a selecting and sending module 1420.

The receiving module 1410 is configured to receive a media access control packet data unit MAC PDU sent by a base station, where the MAC PDU includes data to be sent by a data radio bearer and a logical channel identifier LCID corresponding to the data radio bearer, the data radio bearer is a data radio bearer of a benefitted user equipment UE, the benefitted UE and a supporting UE are UEs in a closed cooperative group, each data radio bearer of each UE in the cooperative group corresponds to a unique LCID; and the selecting and sending module 1420 is configured to send the data in the MAC PDU, received by the receiving module 1410, to the benefitted UE through a short-range communication link.

Through the above user equipment, in this embodiment, all DRBs of all the UEs or all radio bearers of all the UEs correspond to different LCIDs, so that the data in the MAC PDU can uniquely correspond to one DRB or RB of one UE, and the UE can determine, after receiving the MAC PDU, whether it is its own data or determine the data belongs to which DRB or RB of which UE, thereby achieving multiple UEs cooperative communication for synthesizing on the MAC layer.

Figure 15:
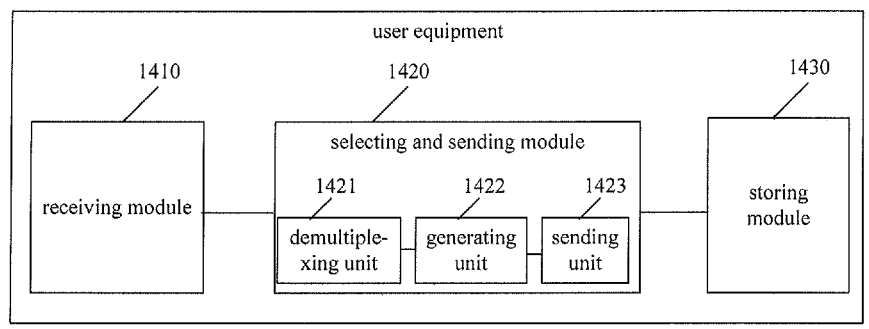
FIG. 15 is a schematic structural diagram of a user equipment according to another embodiment of the present invention.

Further, the selecting and sending module 1420 is specifically configured to directly send the MAC PDU to one or more benefitted UEs through the short-range communication link; or As shown in FIG. 15, the selecting and sending module 1420 includes:

a demultiplexing unit 1421, configured to demultiplex the data to be sent by the data radio bearer in the MAC PDU;

a generating unit 1422, configured to generate a new data packet by using the data to be sent by the data radio bearer, demultiplexed by the demultiplexing unit, where the new data packet includes the data to be sent by the data radio bearer in the MAC PDU and an identifier corresponding to the data radio bearer;

a sending unit 1423, configured to send the new data packet generated by the generating unit to the benefitted UE through the short-range communication link.

The generating unit 1422 is specifically configured to generate the new data packet as follows: take the LCID corresponding to the data radio bearer in the MAC PDU as the identifier corresponding to the data radio bearer, and generate the new data packet.

The generating unit 1422 is specifically configured to generate the new data packet as follows: generating a plurality of new data packets corresponding to the plurality of the benefitted UEs by using data to be sent by a plurality of data radio bearers of a plurality of benefitted UEs included in the MAC PDU; or the generating unit 1422 is specifically configured to generate the new data packet as follows: generate one new data packet by using data to be sent by a plurality of data radio bearers of a plurality of benefitted UEs included in the MAC PDU.

Further, the selecting and sending module 1420 is configured to send the data in the MAC PDU to the benefitted UE through the short-range communication link as follows:

detect the LCID in the MAC PDU, and determine, according to the LCID in the MAC PDU, the benefitted UE to which the data radio bearer corresponding to the LCID in the MAC PDU belongs;

send the data to be sent by the data radio bearer corresponding to the LCID in the MAC PDU to the benefitted UE through the short-range communication link.

As shown in FIG. 15, the user equipment further includes:

a storing module 1430, configured to store a correspondence between each UE in the cooperative group and the LCID of the each UE;

the selecting and sending module 1420 is specifically configured to determine, according to the LCID in the MAC PDU, the benefitted UE to which the data radio bearer corresponding to the LCID belongs as follows: determine, according to the correspondence in the cooperative group stored in the storing module, the benefitted UE corresponding to the LCID in the MAC PDU.

Further, the selecting and sending module 1420 is specifically configured to determine, according to the LCID in the MAC PDU, the benefitted UE to which the data radio bearer corresponding to the LCID in the MAC PDU belongs as follows: detect the LCID in the MAC PDU, and determine, according to the LCID in the MAC PDU, that the data radio bearer corresponding to the LCID in the MAC PDU does not belong to the supporting UE, broadcast the data in the MAC PDU or the MAC PDU in the cooperative group through the short-range communication link, so that the benefitted UE can receive the data in the MAC PDU.

Further, the selecting and sending module 1420 is further configured to demultiplex the MAC PDU, acquire data to be sent by a signalling radio bearer of the supporting UE included in the MAC PDU; reserve the data to be sent by the signalling radio bearer of the supporting UE in the MAC PDU; and/or the selecting and sending module 1420 is further configured to demultiplex the MAC PDU, acquire data to be sent by a signalling radio bearer of the benefitted UE included in the MAC PDU; the selecting and sending module 1420 is specifically configured to send the data in the MAC PDU to the benefitted UE through the short-range communication link as follows: send the data to be sent by the signalling radio bearer of the benefitted UE and the data to be sent by the data radio bearer of the benefitted UE in the MAC PDU to the benefitted UE through the short-range communication link;

where each signalling radio bearer of each UE in the cooperative group corresponds to a LCID, and the LCID corresponding to the each signalling radio bearer is unique in the cooperative group.

Further, the selecting and sending module 1420 is further configured to demultiplex the MAC PDU, acquire data to be sent by a signalling radio bearer of the supporting UE included in the MAC PDU, reserve the data to be sent by the signalling radio bearer in the MAC PDU, where the same signalling radio bearer of each the UE in the cooperative group corresponds to the same LCID.

Further, the selecting and sending module 1420 is further configured to demultiplex the MAC PDU, acquire a MAC control element CE included in the MAC PDU, reserve the MAC CE in the MAC PDU, where the MAC CE is a MAC CE of the supporting UE.

Further, the selecting and sending module 1420 is further configured to demultiplex the MAC PDU, acquire data to be sent by the data radio bearer of the supporting UE further included in the MAC PDU, determine a corresponding data radio bearer of the supporting UE according to the LCID corresponding to the data radio bearer of the supporting UE, and send the data corresponding to the data radio bearer of the supporting UE to the corresponding data radio bearer of the supporting UE.

Further, the selecting and sending module 1420 is specifically configured to send the data in the MAC PDU to the benefitted UE through the short-range communication link as follows: send the data in the MAC PDU to the benefitted UE through a UE in the cooperative group other than the supporting UE and the benefitted UE.

Because the user equipment in this embodiment can perform the method in the above embodiments, the technical effect obtained can correspond to the method embodiments, and specific content can be obtained with reference to descriptions in the above embodiments, and thus the details will not be described herein again.

Figure 16:
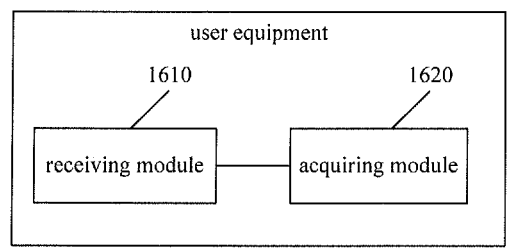
FIG. 16 is a schematic structural diagram of a user equipment according to another embodiment of the present invention.

On the basis of the methods provided by the above embodiments, this embodiment also provides a user equipment for performing the methods in the above embodiments, and specific content can be obtained with reference to descriptions in the above embodiment. As shown in FIG. 16, the user equipment includes: a receiving module 1610 and an acquiring module 1620.

The receiving module 1610 is configured to receive a data packet sent by a supporting UE through a short-range communication link, where the data packet consists of data in a media access control packet data unit MAC PDU sent by a base station to the supporting UE, the data packet includes data to be sent by a data radio bearer of a benefitted UE and an identifier corresponding to the data radio bearer, the benefitted UE and the supporting UE are UEs in a closed cooperative group, each data radio bearer of each UE in the cooperative group corresponds to a logical channel identifier LCID, and the LCID is unique in the cooperative group; and the acquiring module 1620 is configured to acquire, according to the identifier corresponding to the data radio bearer, the data in the data packet received by the receiving module 1610.

Further, the receiving module 1610 is specifically configured to receive the data packet sent by the supporting UE as follows: receive the MAC PDU sent by the supporting UE; or receive the data packet sent by the supporting UE, where the data packet is a data packet formed by using the data to be sent by the data radio bearer of the benefitted UE and the identifier corresponding to the data radio bearer after the supporting UE demultiplexes the MAC PDU.

Further, the receiving module 1610 is specifically configured to receive the data packet further including data to be sent by a signalling radio bearer, where each signalling radio bearer of each UE in the cooperative group corresponds to a unique LCID.

Because the user equipment in this embodiment can perform the methods in the above embodiments, the technical effect obtained can correspond to the method embodiments, and specific content can be obtained with reference to descriptions in the above embodiments, and thus the details will not be described herein again.

Further, an embodiment of the present invention also provides a system for multiple UEs cooperative communication, including a base station (as shown in FIG. 13) provided by the above embodiments and a user equipment (as shown in FIGS. 14 and 16, or FIGS. 15 and 16) provided by the above embodiments. Specific content can be obtained with reference to descriptions in the above embodiments, and thus the details will not be described herein again.

Figure 17:
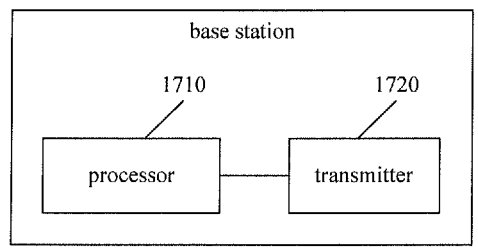
FIG. 17 is a schematic structural diagram of a base station according to another embodiment of the present invention.

On the basis of the methods provided by the above embodiments, this embodiment also provides a base station for performing the methods in the above embodiments, and specific content can be obtained with reference to descriptions in the above embodiments. As shown in FIG. 17, the base station includes: a processor 1710 and a transmitter circuit 1720.

The processor 1710 is configured to select a benefitted user equipment UE, where the benefitted UE and a supporting UE are UEs in a closed cooperative group, each data radio bearer of each UE in the cooperative group corresponds to a logical channel identifier LCID, and the LCID is unique in the cooperative group; and generate a media access control packet data unit MAC PDU, where the MAC PDU includes data to be sent by a data radio bearer of the benefitted UE, and a LCID corresponding to the data radio bearer of the benefitted UE; and The transmitter circuit 1720 is configured to send the MAC PDU to the supporting UE.

Further, the processor 1710 is further configured to take all the UEs in the cooperative group as a whole, and perform scheduling ranking on the cooperative group with other UEs under the base station other than all the UEs in the cooperative group, and select the cooperative group;

the processor 1710 is specifically configured to select the benefitted UE as follows: select one or more benefitted UEs in the cooperative group;

the processor 1710 is specifically configured to generate the MAC PDU as follows: select data from each data radio bearer of the one or more benefitted UEs, and generate the MAC PDU by using the data.

Further, the processor 1710 is specifically configured to take all the UEs in the cooperative group as a whole and perform scheduling ranking on the cooperative group with other UEs under the base station other than all the UEs in the cooperative group as follows: take a value of (the maximum channel quality indicator CQI in the cooperative group÷an average rate AR of the cooperative group)×the number of all the UEs in the cooperative group as a scheduling ranking value of the cooperative group, and perform scheduling ranking on the cooperative group with other UEs under the base station other than all the UEs in the cooperative group.

Further, the processor 1710 is specifically configured to select the benefitted UE as follows: perform scheduling ranking on all the UEs under the base station, and select, by the base station, a benefitted UE;

the processor is specifically configured to generate the MAC PDU as follows: the base station selects the data from the data radio bearer of the one benefitted UE, and generates the MAC PDU by using the data.

Further, the processor 1710 is further configured to incorporate data to be sent by a signalling radio bearer of the benefitted UE and/or the supporting UE in the MAC PDU, where each signalling radio bearer of each UE in the cooperative group corresponds to a unique LCID.

Further, the processor 1710 is further configured to incorporate data to be sent by a signalling radio bearer of the supporting UE in the MAC PDU, where the same signalling radio bearer of all the UEs in the cooperative group corresponds to the same LCID.

Further, the processor 1710 is further configured to incorporate a MAC control element CE of the supporting UE and/or data to be sent by a data radio bearer of the supporting UE in the MAC PDU.

Because the base station in this embodiment can perform the methods in the above embodiments, the technical effect obtained can correspond to the method embodiments, and specific content can be obtained with reference to descriptions in the above embodiments, and thus the details will not be described herein again.

Figure 18:
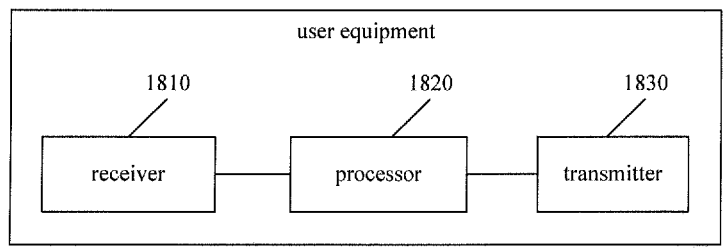
FIG. 18 is a schematic structural diagram of a user equipment according to another embodiment of the present invention.

On the basis of the methods provided by the above embodiments, this embodiment also provides a user equipment for performing the methods in the above embodiments, and specific content can be obtained with reference to descriptions in the above embodiments. As shown in FIG. 18, the user equipment includes: a receiver circuit 1810, a processor 1820 and a transmitter 1830.

The receiver circuit 1810 is configured to receive a media access control packet data unit MAC PDU sent by a base station, where the MAC PDU includes data to be sent by a data radio bearer and a logical channel identifier LCID corresponding to the data radio bearer, the data radio bearer is a data radio bearer of a benefitted user equipment UE, the benefitted UE and a supporting UE are UEs in a closed cooperative group, each data radio bearer of each UE in the cooperative group corresponds to a unique LCID;

the processor 1820 is configured to acquire a LCID and data corresponding to the data radio bearer in the MAC PDU received by the receiver circuit 1810; and the transmitter circuit 1830 is configured to send the data in the MAC PDU, acquired by the processor 1820, to the benefitted UE through a short-range communication link.

Further, the transmitter circuit 1830 is specifically configured to send the data in the MAC PDU to the benefitted UE through the short-range communication link as follows: directly send the MAC PDU to the benefitted UE through the short-range communication link; or the processor 1820 is further configured to demultiplex the data to be sent by the data radio bearer in the MAC PDU, generate a new data packet by using the data to be sent by the data radio bearer, where the new data packet includes the data to be sent by the data radio bearer in the MAC PDU and an identifier corresponding to the data radio bearer; the transmitter circuit 1830 is specifically configured to send the data in the MAC PDU to the benefitted UE through the short-range communication link as follows: send one or more new data packets to one or more benefitted UEs through the short-range communication link.

Further, the processor 1820 is specifically configured to generate the new data packet as follows: take the LCID corresponding to the data radio bearer in the MAC PDU as an identifier corresponding to the data radio bearer, and generate the new data packet by using the LCID corresponding to the data radio bearer in the MAC PDU.

Further, the processor 1820 is specifically configured to generate the new data packet as follows: generating a plurality of new data packets corresponding to the plurality of the benefitted UEs by using data to be sent by a plurality of data radio bearers of a plurality of benefitted UEs included in the MAC PDU; or the processor 1820 is specifically configured to generate the new data packet as follows: generate one new data packet by using data to be sent by a plurality of data radio bearers of a plurality of benefitted UEs included in the MAC PDU.

Further, the processor 1820 is further configured to detect the LCID in the MAC PDU, and determine, according to the LCID in the MAC PDU, the benefitted UE to which the data radio bearer corresponding to the LCID in the MAC PDU belongs;

the transmitter circuit 1830 is specifically configured to send the data in the MAC PDU, acquired by the processor 1820, to the benefitted UE through the short-range communication link as follows: send the data to be sent by the data radio bearer corresponding to the LCID in the MAC PDU to the benefitted UE through the short-range communication link.

Figure 19:
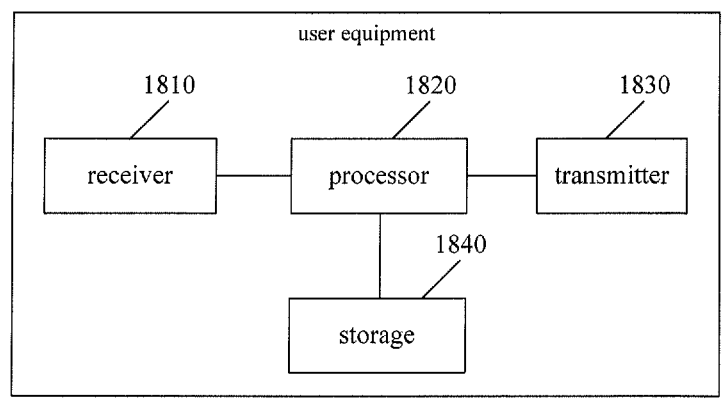
FIG. 19 is a schematic structural diagram of a user equipment according to another embodiment of the present invention.

Further, as shown in FIG. 19, the user equipment further includes:

a storage 1840, configured to store a correspondence between each UE in the cooperative group and the LCID of the each UE;

the processor 1820 is specifically configured to determine, according to the LCID in the MAC PDU, the benefitted UE to which the data radio bearer corresponding to the LCID in the MAC PDU belongs as follows: determine, according to the correspondence stored in the storage, the benefitted UE corresponding to the LCID in the MAC PDU.

Further, the processor 1820 is specifically configured to determine, according to the LCID in the MAC PDU, the benefitted UE to which the data radio bearer corresponding to the LCID in the MAC PDU belongs as follows: detect the LCID in the MAC PDU, and determine, according to the LCID in the MAC PDU, that the data radio bearer corresponding to the LCID in the MAC PDU does not belong to the supporting UE;

the transmitter circuit 1830 is specifically configured to send the data in the MAC PDU, acquired by the processor 1820, to the benefitted UE through the short-range communication link as follows: broadcast the data in the MAC PDU or the MAC PDU in the cooperative group through the short-range communication link, so that the benefitted UE can receive the data in the MAC PDU.

Further, the processor 1820 is further configured to demultiplex the MAC PDU, acquire data to be sent by a signalling radio bearer of the supporting UE included in the MAC PDU; reserve the data to be sent by the signalling radio bearer of the supporting UE in the MAC PDU; and/or the processor 1820 is further configured to demultiplex the MAC PDU, acquire data to be sent by a signalling radio bearer of the benefitted UE included in the MAC PDU; the transmitter circuit 1830 is specifically configured to send the data in the MAC PDU to the benefitted UE through the short-range communication link as follows: send the data to be sent by the signalling radio bearer of the benefitted UE and the data to be sent by the data radio bearer of the benefitted UE in the MAC PDU to the benefitted UE through the short-range communication link;

Where each signalling radio bearer of each UE in the cooperative group corresponds to a LCID, and the LCID is unique in the cooperative group.

Further, the processor 1820 is further configured to demultiplex the MAC PDU, acquire data corresponding to a signalling radio bearer of the supporting UE included in the MAC PDU, reserve the data to be sent by the signalling radio bearer in the MAC PDU, where the same signalling radio bearer of each the UE in the cooperative group corresponds to the same LCID.

Further, the processor 1820 is further configured to demultiplex the MAC PDU, acquire a MAC control element CE included in the MAC PDU, reserve the MAC CE in the MAC PDU, where the MAC CE is a MAC CE of the supporting UE.

Further, the processor 1820 is further configured to demultiplex the MAC PDU, acquire data to be sent by a data radio bearer of the supporting UE further included in the MAC PDU, determine a corresponding data radio bearer of the supporting UE according to the LCID corresponding to the data radio bearer of the supporting UE, and send the data corresponding to the data radio bearer of the supporting UE to the corresponding data radio bearer of the supporting UE.

Further, the transmitter circuit 1830 is specifically configured to send the data in the MAC PDU to the benefitted UE through the short-range communication link as follows: send the data in the MAC PDU to the benefitted UE through a UE in the cooperative group other than the supporting UE and the benefitted UE.

Because the user equipment in this embodiment can perform the methods in the above embodiments, the technical effect obtained can correspond to the method embodiments, and specific content can be obtained with reference to descriptions in the above embodiments, and thus the details will not be described herein again.

Figure 20:
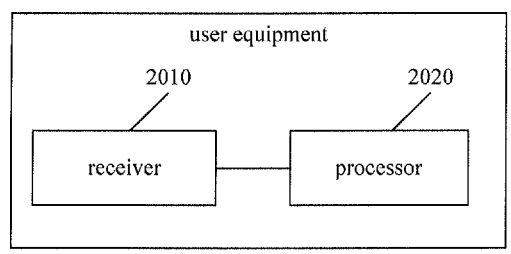
FIG. 20 is a schematic structural diagram of a user equipment according to another embodiment of the present invention.

On the basis of the methods provided by the above embodiments, this embodiment also provides a user equipment for performing the methods in the above embodiments, and specific content can be obtained with reference to descriptions in the above embodiments. As shown in FIG. 20, the user equipment includes: a receiver circuit 2010 and a processor 2020.

The receiver circuit 2010 is configured to receive a data packet sent by a supporting UE through a short-range communication link, where the data packet consists of data in a media access control packet data unit MAC PDU sent by a base station to the supporting UE, the data packet includes the data to be sent by a data radio bearer of a benefitted UE and an identifier corresponding to the data radio bearer, the benefitted UE and the supporting UE are UEs in a closed cooperative group, each data radio bearer of each UE in the cooperative group corresponds to a logical channel identifier LCID, and the LCID is unique in the cooperative group; and the processor 2020 is configured to acquire, according to the identifier corresponding to the data radio bearer, the data in the data packet.

Further, the receiver circuit 2010 is specifically configured to receive the data packet sent by the supporting UE as follows: receive the MAC PDU sent by the supporting UE; or receive the data packet sent by the supporting UE, where the data packet is a data packet formed by using the data to be sent by the data radio bearer of the benefitted UE and the identifier corresponding to the data radio bearer after the supporting UE demultiplexes the MAC PDU.

The receiver circuit 2010 is specifically configured to receive the data packet further including data to be sent by a signalling radio bearer, where each signalling radio bearer of each UE in the cooperative group corresponds to a unique LCID.

Because the user equipment in this embodiment can perform the methods in the above embodiments, the technical effect obtained can correspond to the method embodiments, and specific content can be obtained with reference to descriptions in the above embodiments, and thus the details will not be described herein again.

Further, an embodiment of the present invention also provides a system for multiple UEs cooperative communication, including a base station (as shown in FIG. 17) provided by the above embodiments and a user equipment (as shown in FIGS. 18 and 20, or FIGS. 19 and 20) provided by the above embodiments. Specific content can be obtained with reference to descriptions in the above embodiments, and thus the details will not be described herein again.

It should be noted that, the user equipment and the base station provided by embodiments of the present invention also can include other components such as a RF processor and a power controller etc., in addition to the above modules, and embodiments of the present invention are not limited to the above modules It should be noted that, each module of the above user equipment performs content of the method in another embodiment of the present invention, such as information interaction and implementation processes etc., and specific details can be obtained with reference to descriptions in the method embodiments. Moreover, the embodiment of the user equipment and the above method embodiments are based on the same concept, the technical effect obtained is the same with the method embodiments, and specific content can be obtained with reference to descriptions in the above embodiments, and thus the details will not be described herein again.

It should be noted that, in the above embodiments for the user equipment and the base station, the partitioning of each functional module is for illustration only, in practical application, the above functions can be performed by different function modules as needed, such as, corresponding hardware configuration requirements or for convenience of software implementation, that is, the internal structures of the user equipment and the base station are divided into different function modules, so as to implement all or portions of the functions as described above.

It should be appreciated by persons skilled in the art that, all or a part of the steps in the method of the above embodiments may be implemented by relevant hardware under the instruction of a program, and the program may be stored in a computer readable storage medium, such as a read only memory (ROM), a random access memory (RAM), a floppy disk, or an optical disk, etc.

The method, the user equipment, and the base station provided in embodiments of the present invention have been introduced in detail above, the specific cases are used here to explain the principle and implementations of the present invention, and the above description of embodiments is merely intended to facilitate understanding the methods of the invention and its core concept; meanwhile, it is apparent to persons skilled in the art that changes can be made to the specific implementations and application scope of the present invention based on the concept of the invention, in view of the above, the content of the specification shall not be considered as a limitation to the present invention.

What is claimed is:

1. A method, comprising:
   selecting, by a base station, a benefitted user equipment (UE) from a closed cooperative group, wherein the benefitted UE is a UE in the closed cooperative group and can be supported by a supporting UE, the supporting UE is a UE in the cooperative group and is different from the benefited, each data radio bearer of UEs in the cooperative group corresponds to a unique logical channel identifier (LCID), LCIDs of radio bearers in the cooperative group are all different, and LCIDs in different cooperative groups can be the same;
   generating, by the base station, a media access control packet data unit (MAC PDU), wherein the MAC PDU comprises data to be sent by a data radio bearer of the benefitted UE and a LCID corresponding to the data radio bearer of the benefitted UE; and
   sending, by the base station, the MAC PDU to the supporting UE, wherein the data in the MAC PDU is further sent by the supporting UE to the benefitted UE through a short-range communication link according to the LCID corresponding to the data radio bearer of the benefitted UE in the MAC PDU, wherein the short-range communication link is any one of a wireless local area network (WLAN) link, a personal area network (WPAN) link, a home radio frequency (HomeRF) link, an infrared transmission technology link, or a LTE-device to device (LTE-D2D) link;
   before selecting the benefitted UE by the base station, performing, by taking all the UEs in the cooperative group as a whole by the base station, scheduling ranking on the cooperative group with other UEs under the base station other than all the UEs in the cooperative group, and selecting the cooperative group;
   wherein the performing of the scheduling ranking on the cooperative group with other UEs under the base station other than all the UEs in the cooperative group, comprises:
   dividing a maximum channel quality indicator (CQI) in the cooperative group by an average rate (AR) of the cooperative group, then multiply by the number of all the UEs in the cooperative group to obtain the scheduling ranking.

2. The method according to claim 1, wherein
   the selecting of the benefitted UE by the base station, comprises
   selecting by the base station, one or more benefitted UEs in the cooperative group;
   the generating of the MAC PDU by the base station, comprises: selecting by the base station, the data from each data radio bearer of the one or more benefitted UEs, and generating the MAC PDU by using the data.

3. The method according to claim 1, wherein:
   the selecting of the benefitted UE by the base station, comprises:
   performing by the base station: scheduling ranking on all the UEs under the base station, and selecting one benefitted UE;
   the generating of the MAC PDU by the base station, comprises:
   selecting by the base station, the data from the data radio bearer of the one benefitted UE in order to generate the MAC PDU.

4. The method according to claim 1, wherein the MAC PDU further comprises data to be sent by the signalling radio bearer of the supporting UE and data to be sent by a signalling radio bearer of the benefitted UE: each signalling radio bearer of each UE in the cooperative group corresponds to a unique LCID.

5. The method according to claim 1, wherein the MAC PDU comprises data to be sent by the signalling radio bearer of the supporting UE and does not comprises data to be sent by a signalling radio bearer of the supporting UE:
   a same signalling radio bearer of all the UEs in the cooperative group corresponds to a same LCID.

6. The method according to claim 1, wherein:
   the MAC PDU further comprises one or both of: a MAC control element (CE) of the supporting UE and data to be sent by a data radio bearer of the supporting UE.

7. A user equipment (UE), wherein the UE is a supporting UE, comprises:
   a receiver circuit, configured to receive a media access control packet data unit (MAC PDU) sent by a base station, wherein the MAC PDU comprises data to be sent by a data radio bearer of a benefitted UE and a logical channel identifier (LCID) corresponding to the data radio bearer of the benefitted UE, the benefitted UE is a UE in a closed cooperative group and can be supported by the supporting UE, the supporting UE is a UE in the cooperative group and is different from the benefited UE, each data radio bearer of UEs in the cooperative group corresponds to a unique LCID, LCIDs of radio bearers in the cooperative group are all different, and LCIDs in different cooperative groups can be the same and the benefitted UE is selected by the base station by scheduling ranking on the cooperative group with other UEs under the base station other than all the UEs in the cooperative group by taking all the UEs in the cooperative group as a whole by the base station, and the cooperative group is selected; wherein the scheduling ranking on the cooperative group with other UEs under the base station other than all the UEs in the cooperative group, comprises: dividing a maximum channel quality indicator (CQI) in the cooperative group by an average rate (AR) of the cooperative group, then multiply by the number of all the UEs in the cooperative group to obtain the scheduling ranking;

a processor, configured to acquire the LCID corresponding to the data radio bearer of the benefited UE, and the data to be sent by the data radio bearer of the benefited UE in the MAC PDU received by the receiver circuit; and a transmitter circuit, configured to send the data in the MAC PDU, acquired by the processor, to the benefitted UE through a short-range communication link according to the LCID corresponding to the data radio bearer of the benefitted UE in the MAC PDU, wherein the short-range communication link is any one of a wireless local area network (WLAN) link, a personal area network (WPAN) link, a home radio frequency (HomeRF) link, an infrared transmission technology link, or a LTE-device to device (LTE-D2D) link.

8. The user equipment according to claim 7, wherein:
the transmitter circuit is configured to send the data to be sent by the data radio bearer of the benefited UE in the MAC PDU to the benefitted UE through the short-range communication link as follows: directly send the MAC PDU to the benefitted UE through the short-range communication link; or
the processor is further configured to demultiplex the data to be sent by the data radio bearer of the benefited UE in the MAC PDU, generate a new data packet by using the data to be sent by the data radio bearer of the benefited UE, wherein the new data packet comprises the data to be sent by the data radio bearer of the benefited UE in the MAC PDU and an identifier corresponding to the data radio bearer of the benefited UE; the transmitter circuit is specifically configured to send the data to be sent by the data radio bearer of the benefited UE in the MAC PDU to the benefitted UE through the short-range communication link as follows: send one or more new data packets to one or more benefitted UEs through the short-range communication link.

9. The user equipment according to claim 8, wherein:
the processor is configured to generate the new data packet as follows: take a LCID corresponding to the data radio bearer of the benefited UE in the MAC PDU as the identifier corresponding to the data radio bearer of the benefited UE, and generate the new data packet by using the LCID corresponding to the data radio bearer of the benefited UE in the MAC PDU.

10. The user equipment according to claim 7, wherein:
the processor is further configured to detect the LCID in the MAC PDU, and determine, according to the LCID corresponding to the data radio bearer of the benefitted UE in the MAC PDU, the benefitted UE to which the data radio bearer of the benefited UE corresponding to the LCID corresponding to the data radio bearer of the benefitted UE in the MAC PDU belongs;
the transmitter circuit is configured to send the data to be sent by the data radio bearer of the benefited UE in the MAC PDU acquired by the processor to the benefitted UE through the short-range communication link as follows: send the data to be sent by the data radio bearer of the benefited UE corresponding to the LCID corresponding to the data radio bearer of the benefitted UE in the MAC PDU to the benefitted UE through the short-range communication link.

11. The user equipment according to claim 7, wherein:
the processor is configured to determine, according to the LCID in the MAC PDU, the benefitted UE to which the data radio bearer of the benefited UE corresponding to the LCID corresponding to the data radio bearer of the benefitted UE in the MAC PDU belongs as follows: detect the LCIDs in the MAC PDU, and determine, according to the LCID corresponding to the data radio bearer of the benefitted UE in the MAC PDU, that the data radio bearer of the benefited UE corresponding to the LCID corresponding to the data radio bearer of the benefitted UE in the MAC PDU does not belong to the supporting UE;
the transmitter circuit is configured to send the data to be sent by the data radio bearer of the benefited UE in the MAC PDU, acquired by the processor, to the benefitted UE through the short-range communication link as follows: broadcast the data to be sent by the data radio bearer of the benefited UE in the MAC PDU or the MAC PDU in the cooperative group through the short-range communication link, so that the benefitted UE receives the data in the MAC PDU.

12. The user equipment according to claim 7, wherein the MAC PDU comprises data to be sent by a signalling radio bearer of the supporting UE and data to be sent by a signalling radio bearer of the benefitted UE:
the processor is further configured to perform one or both of:
demultiplex the MAC PDU, acquire the data to be sent by the signalling radio bearer of the supporting UE comprised in the MAC PDU; reserve the data to be sent by the signalling radio bearer of the supporting UE in the MAC PDU; and
demultiplex the MAC PDU, acquire the data to be sent by the signalling radio bearer of the benefitted UE; wherein the transmitter circuit is configured to send the data to be sent by the signaling radio bearer of the benefited UE in the MAC PDU to the benefitted UE through the short-range communication link as follows: send the data to be sent by the signalling radio bearer of the benefitted UE and the data to be sent by the data radio bearer of the benefitted UE in the MAC PDU to the benefitted UE through the short-range communication link;
wherein each signalling radio bearer of the each UE in the cooperative group corresponds to a LCID, wherein the LCID corresponding to each signalling radio bearer is unique in the cooperative group.

13. The user equipment according to claim 7, wherein the MAC PDU comprises data to be sent by a signalling radio bearer of the supporting UE and does not comprises data to be sent by a signalling radio bearer of the benefited UE:
  the processor is further configured to demultiplex the MAC PDU, acquire the data corresponding to the signalling radio bearer of the supporting UE, reserve the data to be sent by the signalling radio bearer of the supporting UE in the MAC PDU, wherein a same signalling radio bearer of each the UE in the cooperative group corresponds to a same LCID.

14. The user equipment according to claim 7, wherein the MAC PDU further comprises a MAC control element (CE) of the supporting UE:
  the processor is further configured to demultiplex the MAC PDU, acquire the MAC, and reserve the MAC CE in the MAC PDU.

15. The user equipment according to claim 7, wherein the MAC PDU further comprises data to be sent by a data radio bearer of the supporting UE:
  the processor is further configured to:
  demultiplex the MAC PDU, acquire the data to be sent by the data radio bearer of the supporting UE,
  determine a corresponding data radio bearer of the supporting UE according to the LCID corresponding to the data radio bearer of the supporting UE, and
  send the data to be sent by the data radio bearer of the supporting UE to the corresponding data radio bearer of the supporting UE.

16. The user equipment according to claim 7, wherein:
  the transmitter circuit is configured to send the data in the MAC PDU to the benefitted UE through the short-range communication link as follows: forward the data in the MAC PDU to the benefitted UE through a UE in the cooperative group other than the supporting UE and the benefitted UE.

17. A user equipment (UE) wherein the UE is a benefitted UE, comprising:
  a receiver circuit, configured to receive a data packet sent by a supporting UE through a short-range communication link, the data packet consists of data to be sent by a data radio bearer of the benefited UE in a media access control packet data unit (MAC PDU) sent by a base station to the supporting UE and an identifier corresponding to the data radio bearer of the benefited UE, and the benefited UE is a UE in the closed cooperative group and can be supported by the supporting UE, the supporting UE is a UE in the cooperative group and is different from the benefited UE, each data radio bearer of UEs in the cooperative group corresponds to a unique logical channel identifier (LCID), LCIDs of radio bearers in the cooperative group are all different, and LCIDs in different cooperative groups can be the same, and LCIDs in different cooperative groups can be the same, and wherein the MAC PDU sent by the base station to the supporting UE comprises the data to be sent by a data radio bearer of the benefitted UE, a LCID corresponding to the data radio bearer of the benefited UE, and the identifier corresponding to the data radio bearer of the benefited UE in the data packet corresponds to the LCID corresponding to the data radio bearer of the benefited UE, and wherein the short-range communication link is any one of a wireless local area network (WLAN) link, a personal area network (WPAN) link, a home radio frequency (HomeRF) link, an infrared transmission technology link, or a LTE-device to device (LTE-D2D) link; and
  a processor, configured to:
  acquire, according to the identifier corresponding to the data radio bearer of the benefited UE, the data to be sent by the data radio bearer of the benefited UE in the data packet; and
  determine, according to the LCID corresponding to the data radio bearer of the benefitted UE in the MAC PDU, the benefitted UE to which the data radio bearer of the benefited UE corresponding to the LCID corresponding to the data radio bearer of the benefitted UE in the MAC PDU belongs by: detecting, the LCIDs in the MAC PDU, and determining, according to the LCID corresponding to the data radio bearer of the benefitted UE in the MAC PDU, that the data radio bearer corresponding to the LCID corresponding to the data radio bearer of the benefitted UE in the MAC PDU does not belong to the supporting UE;
  before determining the benefitted UE, performing, by taking all the UEs in the cooperative group as a whole, performing scheduling ranking on the cooperative group with other UEs other than all the UEs in the cooperative group, and selecting the cooperative group, wherein the performing of the scheduling ranking on the cooperative group with other UEs other than all the UEs in the cooperative group, comprises: dividing a maximum channel quality indicator (CQI) in the cooperative group by an average rate (AR) of the cooperative group, then multiply by the number of all the UEs in the cooperative group to obtain the scheduling ranking.

18. The user equipment according to claim 17, wherein:
  the receiver circuit is configured to receive the data packet sent by the supporting UE as follows: receive the MAC PDU sent by the supporting UE; or receive the data packet sent by the supporting UE, wherein the data packet is a data packet formed by the supporting UE using the data to be sent by the data radio bearer of the benefitted UE and the identifier corresponding to the data radio bearer after-demultiplexing the MAC PDU.

19. The user equipment according to claim 17, wherein the MAC PDU comprises data to be sent by a signalling radio bearer of the supporting UE and data to be sent by a signalling radio bearer of the benefitted UE:
  the receiver circuit is configured to receive the data packet further comprising data to be sent by the signalling radio bearer of the benefited UE, wherein each signalling radio bearer of the each UE in the cooperative group corresponds to a unique LCID.

20. A method, comprising:
  receiving, by a supporting user equipment (UE), a media access control packet data unit (MAC PDU) sent by a base station, wherein the MAC PDU comprises data to be sent by a data radio bearer of a benefitted UE, and a logical channel identifier (LCID) corresponding to the data radio bearer of the benefitted UE, the benefitted UE is a UE in a closed cooperative group and can be supported by the supporting UE, the supporting UE is a UE in the cooperative group and is different from the benefited UE, each data radio bearer of UEs in the cooperative group corresponds to a unique LCID, LCIDs of radio bearers in the cooperative group are all different, and LCIDs in different cooperative groups can be the same;

determining, by the supporting UE, according to the LCID corresponding to the data radio bearer of the benefitted UE in the MAC PDU, the benefitted UE to which the data radio bearer of the benefited UE corresponding to the LCID corresponding to the data radio bearer of the benefitted UE in the MAC PDU belongs comprising: detecting, by the supporting UE, the LCIDs in the MAC PDU, and determining, by the supporting UE, according to the LCID corresponding to the data radio bearer of the benefitted UE in the MAC PDU, that the data radio bearer corresponding to the LCID corresponding to the data radio bearer of the benefitted UE in the MAC PDU does not belong to the supporting UE;

before determining the benefitted UE by the supporting UE, performing, by taking all the UEs in the cooperative group as a whole, scheduling ranking on the cooperative group with other UEs other than all the UEs in the cooperative group, and selecting the cooperative group, wherein the performing of the scheduling ranking on the cooperative group with other UEs other than all the UEs in the cooperative group, comprises: dividing a maximum channel quality indicator (CQI) in the cooperative group by an average rate (AR) of the cooperative group, then multiply by the number of all the UEs in the cooperative group to obtain the scheduling ranking;

acquiring, by the supporting UE, the LCID corresponding to the data radio bearer of the benefited UE, and the data to be sent by the data radio bearer of the benefited UE in the MAC PDU; and sending, by the supporting UE, the data in the MAC PDU, to the benefitted UE through a short-range communication link according to the LCID corresponding to the data radio bearer of the benefitted UE in the MAC PDU, wherein the short-range communication link is any one of a wireless local area network (WLAN) link, a personal area network (WPAN) link, a home radio frequency (HomeRF) link, an infrared transmission technology link, or a LTE-device to device (LTE-D2D) link.

21. The method according to claim 20, wherein the sending, by the supporting UE, the data to be sent by the data radio bearer of the benefited UE in the MAC PDU, to the benefitted UE through a short-range communication link, comprising one of the following:
(a) directly sending, by the supporting UE, the MAC PDU to the benefitted UE through the short-range communication link; and
(b) demultiplexing, by the supporting UE, the data to be sent by the data radio bearer of the benefited UE in the MAC PDU, generating, by the supporting UE, a new data packet by using the data to be sent by the data radio bearer of the benefited UE, wherein the new data packet comprises the data to be sent by the data radio bearer of the benefited UE in the MAC PDU and an identifier corresponding to the data radio bearer of the benefited UE; and sending, by the supporting UE, the data to be sent by the data radio bearer of the benefited UE in the MAC PDU to the benefitted UE through the short-range communication link comprising sending one or more new data packets to one or more benefitted UEs through the short-range communication link.

22. The method according to claim 21, wherein the generating, by the supporting UE, a new data packet by using the data to be sent by the data radio bearer of the benefited UE, comprising:

generating, by the supporting UE, the new data packet as follows: taking a LCID corresponding to the data radio bearer of the benefited UE in the MAC PDU as the identifier corresponding to the data radio bearer of the benefited UE, and generate the new data packet by using the LCID corresponding to the data radio bearer of the benefited UE in the MAC PDU.

23. The method according to claim 20, further comprising:
detecting, by the supporting UE, the LCID in the MAC PDU, and determining, by the supporting UE, according to the LCID corresponding to the data radio bearer of the benefitted UE in the MAC PDU, the benefitted UE to which the data radio bearer of the benefited UE corresponding to the LCID corresponding to the data radio bearer of the benefitted UE in the MAC PDU belongs;
wherein the sending, by the supporting UE, the data to be sent by the data radio bearer of the benefited UE in the MAC PDU to the benefitted UE through the short-range communication link, comprises:
sending, by the supporting UE, the data to be sent by the data radio bearer of the benefited UE corresponding to the LCID corresponding to the data radio bearer of the benefitted UE in the MAC PDU to the benefitted UE through the short-range communication link.

24. The method according to claim 20, further comprising:
wherein the sending, by the supporting UE, the data to be sent by the data radio bearer of the benefited UE in the MAC PDU to the benefitted UE through the short-range communication link comprises:
broadcasting, by the supporting UE, the data to be sent by the data radio bearer of the benefited UE in the MAC PDU in the cooperative group through the short-range communication link, so that the benefitted UE receives the data to be sent by the data radio bearer of the benefited UE in the MAC PDU.

25. The method according to claim 20, wherein the MAC PDU comprises data to be sent by a signalling radio bearer of the supporting UE and data to be sent by a signalling radio bearer of the benefitted UE, the method further comprising:
demultiplexing, by the supporting UE, the MAC PDU, acquiring, by the supporting UE, the data to be sent by the signalling radio bearer of the supporting UE; reserving, by the supporting UE, the data to be sent by the signalling radio bearer of the supporting UE in the MAC PDU; and
demultiplexing, by the supporting UE, the MAC PDU, acquiring, by the supporting UE, the data to be sent by the signalling radio bearer of the benefitted UE; wherein the sending , by the supporting UE, the data to be sent by the signaling radio bearer of the benefited UE in the MAC PDU to the benefitted UE through the short-range communication link comprises: sending, by the supporting UE, the data to be sent by the signalling radio bearer of the benefitted UE and the data to be sent by the data radio bearer of the benefitted UE in the MAC PDU to the benefitted UE through the short-range communication link;
wherein each signalling radio bearer of the each UE in the cooperative group corresponds to a LCID, wherein the LCID corresponding to each signalling radio bearer is unique in the cooperative group.

26. The method according to claim 20, wherein the MAC PDU comprises data to be sent by the signalling radio bearer of the supporting UE and does not comprises data to be sent by a signalling radio bearer of the benefited UE, the method further comprising:
  demultiplexing, by the supporting UE, the MAC PDU, acquiring, by the supporting UE, data corresponding to the signalling radio bearer of the supporting UE, reserving, by the supporting UE, the data to be sent by the signalling radio bearer of the supporting UE in the MAC PDU, wherein a same signalling radio bearer of each the UE in the cooperative group corresponds to a same LCID.

27. The method according to claim 20, wherein the MAC PDU further comprises a MAC control element (CE) of the supporting UE, the method further comprising:
  demultiplexing, by the supporting UE, the MAC PDU, acquiring, by the supporting UE, the MAC, and reserving, by the supporting UE, the MAC CE in the MAC PDU.

28. The method according to claim 20, wherein the MAC PDU further comprises data to be sent by a data radio bearer of the supporting UE, the sending the data to be sent by the data radio bearer of the supporting UE to a corresponding data radio bearer of the supporting UE further comprises:
  demultiplexing, by the supporting UE, the MAC PDU;
  acquiring, by the supporting UE, the data to be sent by the data radio bearer of the supporting UE;
  determining, by the supporting UE, a corresponding data radio bearer of the supporting UE according to the LCID corresponding to the data radio bearer of the supporting UE; and
  sending, by the supporting UE, the data to be sent to the data radio bearer of the supporting UE to the corresponding data radio bearer of the supporting UE.

29. The method according to claim 20, wherein the sending, by the supporting UE, the data to be sent by the data radio bearer of the benefited UE in the MAC PDU to the benefitted UE through the short-range communication link comprises:
  forwarding, by the supporting UE, the data to be sent by the data radio bearer of the benefited UE in the MAC PDU to the benefitted UE through a UE in the cooperative group other than the supporting UE and the benefitted UE.

30. A system for transmitting downlink data in multiple user equipments (UEs) cooperative communication, comprising:
  a supporting UE, which is configured to:
  receive a media access control packet data unit (MAC PDU) sent by a base station, wherein the MAC PDU comprises data to be sent by a data radio bearer of a benefitted UE, and a logical channel identifier (LCID) corresponding to the data radio bearer of the benefited UE, the benefitted UE is a UE in the closed cooperative group and can be supported by the supporting UE, the supporting UE is a UE in the cooperative group and is different from the benefited UE, each data radio bearer of UEs in the cooperative group corresponds to a unique LCID, LCIDs of radio bearers in the cooperative group are all different, and LCIDs in different cooperative groups can be the same; acquire the LCID corresponding to the data radio bearer and the data of the data radio bearer in the MAC PDU; send the data to be sent by the data radio bearer of the benefited UE in the MAC PDU to the benefitted UE through a short-range communication link according to the LCID corresponding to the data radio bearer of the benefited UE in the MAC PDU, wherein the short-range communication link is any one of a wireless local area network (WLAN) link, a personal area network (WPAN) link, a home radio frequency (HomeRF) link, an infrared transmission technology link, or a LTE-device to device (LTE-D2D) link; and
  determine, according to the LCID corresponding to the data radio bearer of the benefitted UE in the MAC PDU, the benefitted UE to which the data radio bearer of the benefited UE corresponding to the LCID corresponding to the data radio bearer of the benefitted UE in the MAC PDU belongs by: detecting, by the supporting UE, the LCIDs in the MAC PDU, and determining, by the supporting UE, according to the LCID corresponding to the data radio bearer of the benefitted UE in the MAC PDU, that the data radio bearer corresponding to the LCID corresponding to the data radio bearer of the benefitted UE in the MAC PDU does not belong to the supporting UE; wherein before determining the benefitted UE, performing, by taking all the UEs in the cooperative group as a whole, scheduling ranking on the cooperative group with other UEs other than all the UEs in the cooperative group, and selecting the cooperative group, wherein the performing of the scheduling ranking on the cooperative group with other UEs other than all the UEs in the cooperative group, comprises: dividing a maximum channel quality indicator (CQI) in the cooperative group by an average rate (AR) of the cooperative group, then multiply by the number of all the UEs in the cooperative group to obtain the scheduling ranking;
  a benefited UE, which is configured to:
  receive a data packet sent by the supporting UE through the short-range communication link, wherein the data packet consists of the data to be sent by the data radio bearer of the benefited UE in the MAC PDU sent by the base station to the supporting UE and an identifier corresponding to the data radio bearer of the benefited UE; and acquire, according to the identifier corresponding to the data radio bearer, the data to be sent by the data radio bearer of the benefited UE in the data packet.

* * * * *